United States Patent
Knooren

(10) Patent No.: US 12,155,261 B2
(45) Date of Patent: Nov. 26, 2024

(54) SYSTEM AND A METHOD FOR TRANSFERRING POWER BETWEEN A MASTER CONTROL UNIT AND A LOCAL CONTROL UNIT COUPLED TO AN ENERGY STORAGE STRING

(71) Applicant: VITO NV, Mol (BE)

(72) Inventor: Boudewijn Knooren, Mol (BE)

(73) Assignee: VITO NV, Mol (BE)

( * ) Notice: Subject to any disclaimer, the term of this patent is extended or adjusted under 35 U.S.C. 154(b) by 643 days.

(21) Appl. No.: 17/415,809

(22) PCT Filed: Dec. 24, 2019

(86) PCT No.: PCT/EP2019/087034
§ 371 (c)(1),
(2) Date: Jun. 18, 2021

(87) PCT Pub. No.: WO2020/136214
PCT Pub. Date: Jul. 2, 2020

(65) Prior Publication Data
US 2022/0140643 A1    May 5, 2022

(30) Foreign Application Priority Data
Dec. 28, 2018 (EP) .................................... 18248230

(51) Int. Cl.
*H02J 7/34* (2006.01)
*H02J 7/00* (2006.01)

(52) U.S. Cl.
CPC .......... *H02J 7/345* (2013.01); *H02J 7/00032* (2020.01); *H02J 7/0016* (2013.01); *H02J 7/0047* (2013.01); *H02J 2207/10* (2020.01)

(58) Field of Classification Search
CPC ........ H02J 7/345; H02J 7/0016; H02J 7/0047; H02J 7/00032; H02J 2207/10
(Continued)

(56) References Cited

U.S. PATENT DOCUMENTS

| | | | | |
|---|---|---|---|---|
| 5,703,464 A | * | 12/1997 | Karunasiri | ............ H02J 7/0016 320/125 |
| 2015/0340888 A1 | * | 11/2015 | Hofer | .................... H01M 10/48 320/116 |
| 2016/0269195 A1 | * | 9/2016 | Coenen | ............... H02J 7/00047 |

FOREIGN PATENT DOCUMENTS

| | | |
|---|---|---|
| CN | 105765873 A | 7/2016 |
| EP | 2228883 A2 | 9/2010 |

(Continued)

OTHER PUBLICATIONS

ISR and Written Opinion in corresponding PCT Application No. PCT/EP2019/087034 dated Feb. 11, 2020.
(Continued)

*Primary Examiner* — Edward Tso
*Assistant Examiner* — Aaron Piggush
(74) *Attorney, Agent, or Firm* — BACON & THOMAS, PLLC

(57) ABSTRACT

An energy storage system including an energy storage string formed by rechargeable cells connected in series and an energy management device including a master control unit and at least a first local control unit associated to a first rechargeable cell. A storage string connecting circuit is coupling a positive string terminal with a negative string terminal and a cell connecting circuit is coupling a positive and a negative cell terminal of the first rechargeable cell. The storage string connecting circuit includes a first capacitor device forming with the energy storage string a first closed-loop LC-circuit, and/or the cell connecting circuit includes a second capacitor device forming with the first rechargeable cell a second closed-loop LC-circuit. A master AC signal generator and a local signal generator are configured for (Continued)

Figure 1:
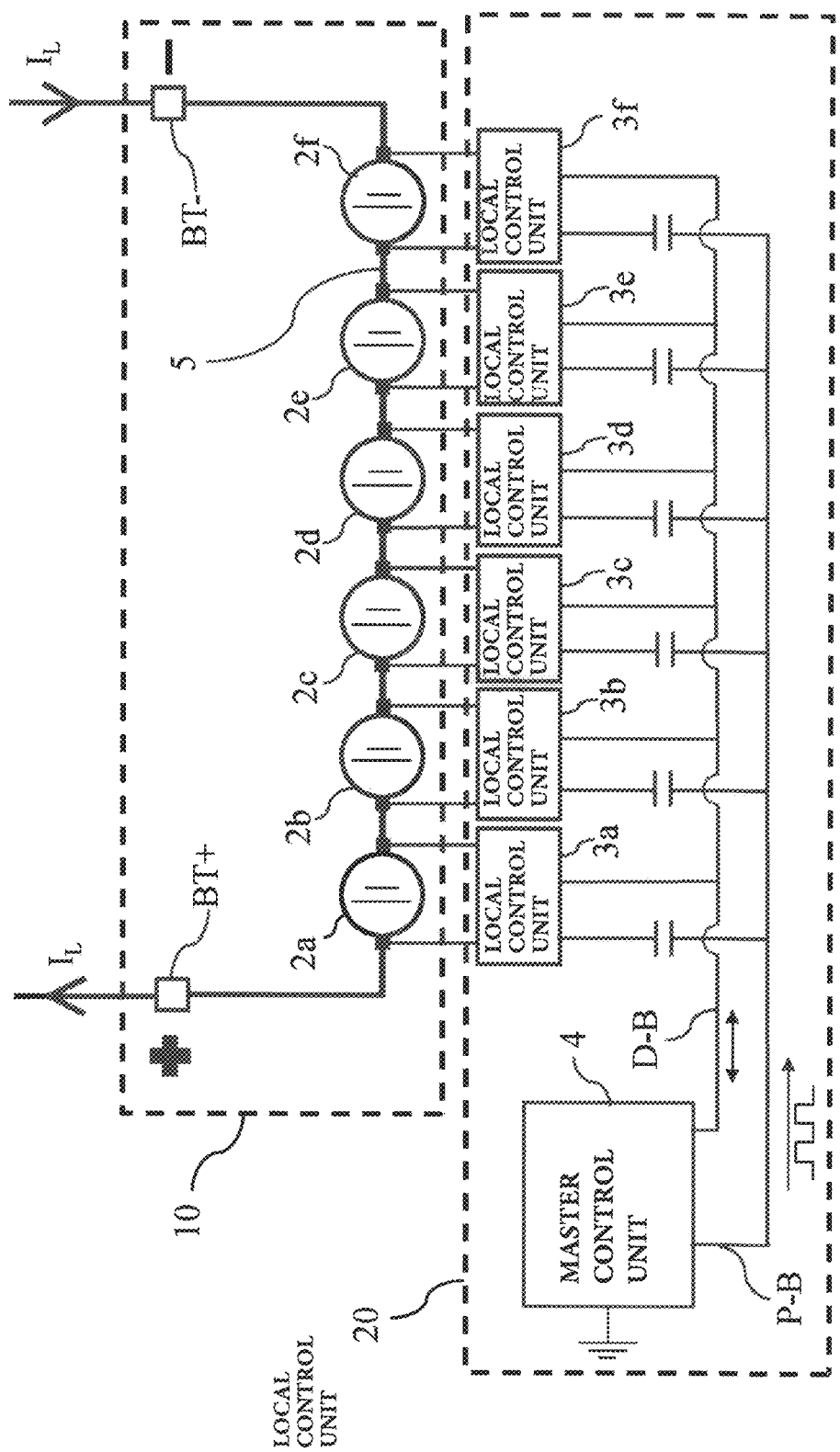

generating a first and a second AC pulse in respectively the storage string connecting circuit and the cell connecting circuit.

17 Claims, 14 Drawing Sheets

(58) Field of Classification Search
USPC .................. 320/118, 139, 140, 141, 166
See application file for complete search history.

(56) References Cited

FOREIGN PATENT DOCUMENTS

| | | |
|---|---|---|
| EP | 2302757 A1 | 3/2011 |
| EP | 2980912 A1 | 2/2016 |
| EP | 3061197 B1 | 11/2017 |
| JP | H11-509669 A | 8/1999 |
| WO | 2010038136 A1 | 4/2010 |

OTHER PUBLICATIONS

Alexander Scherer, A Smart Battery Management System for Electric Vehicles using Powerline Communication, Mar. 31, 2013, pp. 1-135.
EP Search Report in corresponding EP Application No. 18248230.7, May 8, 2019.

* cited by examiner

SYSTEM AND A METHOD FOR TRANSFERRING POWER BETWEEN A MASTER CONTROL UNIT AND A LOCAL CONTROL UNIT COUPLED TO AN ENERGY STORAGE STRING

FIELD OF THE INVENTION

The present invention relates in general to the field of energy storage systems comprising rechargeable cells for storing electrical energy and wherein an energy management device is controlling the rechargeable cells. More specifically, the invention relates to an energy storage string formed by connecting a plurality of rechargeable cells in series via electrical connectors.

BACKGROUND OF THE INVENTION

Rechargeable cells connected in series to form an energy storage string are used for a variety of applications where an energy supply is required. Examples of rechargeable cells are rechargeable battery cells or ultracapacitors. Ultracapacitors are also known as supercapacitors or electrical double layer capacitors (EDLC). By connecting several rechargeable cells together in series, an energy storage string operable at a higher voltage than an individual cell is obtained.

A battery string formed by battery cells placed in series is for example used for automotive applications such as start-up batteries for vehicles or batteries for electrically powered vehicles. A string of ultracapacitors formed by ultracapacitors placed in series is for example used for automotive applications to boost for example the battery in a hybrid electric vehicle.

In some applications, a number of rechargeable battery cells are first grouped in modules and the modules can then further be grouped together to form what is generally named a battery pack.

A rechargeable battery cell is to be construed as an electrochemical cell that can store electric energy in the form of electric charge. A battery cell typically has a voltage between 2V and 5V. An example of a rechargeable battery cell is a lithium ion cell.

On the other hand, the energy storage for ultracapacitors is primarily electrostatic, rather than faradaic as is the case for battery cells. The maximum voltage is typically limited to 3V.

The energy storage strings are generally equipped with an energy management device (EMD) comprising for example a master control unit and a plurality of local control units each associated to one of the rechargeable cells. The EMD is intended for safety and feedback purposes and also for energy balancing. The energy storage string and the EMD are forming an energy storage system (ESS).

When battery cells are used, the energy management device is generally named battery management system (BMS). The major functionalities are safeguarding the safe operating area (SOA) of the rechargeable cell, balancing the rechargeable cells and giving feedback to the user about the states of the battery.

Typically, the local control units are configured for monitoring a number of parameters such as for example the voltage and/or temperature of the rechargeable battery cell. Indeed, battery cells are not homogeneous and there is always some deviation between the cells, i.e. the cells can differ in charge, voltage, internal resistance and capacity.

Typically, the local control unit comprises a number of circuits and a microcontroller to perform the monitoring operations.

For each of the rechargeable battery cells, the local control unit can communicate the monitored voltage and/or temperature to the master control unit that aggregates the information. To ensure safety and a long lifetime of the battery cell, the safe operation area is to be respected. That means that for example the voltage of the battery cells are not allowed to exceed certain limits, generally defined by a minimum and a maximum voltage value. If one of the cells is about to exceed the limits, the master control unit can generate a command signal to for example disrupt current in the battery and disconnected the battery cell or disconnect the entire battery from use. The communication between the master control unit and the local control units happen mostly by dedicated protocols and communication busses.

As mentioned above, besides monitoring, the BMS or more generally the EMD, is also equipped for energy balancing which is a process of optimising the charge of the different rechargeable cells. With a passive energy balancing method, the local control unit typically discharges the rechargeable cell by generating a current flow through a resistor. With an active energy balancing method, energy can be exchanged between different rechargeable cells or between a rechargeable cell and the EMD. With active energy balancing, it is also possible to charge rechargeable cells instead of only discharging them as is the case with passive energy balancing.

The local control unit also requires an operational power and for this purpose power from its associated rechargeable cell is generally used. As a consequence, to rebalance the energy of the rechargeable cell, additional power needs to be supplied to the local control unit.

An energy storage string comprising an EMD for active energy balancing is described in EP2302757A1 and an example of such a system is schematically illustrated in FIG. 1. The master control unit 4 of the EMD 20 can exchange data with the local control units 3a,3b,3c,3d,3e,3f through a CAN bus D-B and power can be provided from the master control unit to the local control units by sending power pulses over a power bus P-B. The CAN bus and the power bus are isolated from the local control units using respectively, optocouplers and a series of capacitors.

One of the problems with current energy storage strings comprising an EMD is that a large number of wiring needs to be provided between the master controller and the plurality of local controllers. Indeed, depending on the type of energy storage string, the string can comprise a large number of rechargeable cells going from tens to hundreds of cells. Today, installing an EMD in an energy storage string is not automated and the wiring between the master controller and the local controllers is done manually as it is hard to automate this activity. Hence, the wiring is a serious cost in terms of labour and time to market new energy storage devices.

A potential solution that has been proposed is to use wireless communication for communication between the master control unit and the local control units. However when using wireless communication strategies, the risk exists that the communication will be challenging since a rechargeable cell is generally a highly metalized environment. Metals tend to block RF signals that are used to transmit data through the air in wireless communication. An example of wireless communication system for a battery system is for example disclosed in EP2980912B1.

In patent EP3061197B1, a battery system is proposed wherein the wiring can be reduced to some extent by using a single bus for both data and power transmission between the master control unit and a local control unit.

A further alternative to reduce the number of wiring is to group the rechargeable cells in modules as mentioned above and perform the monitoring and control only on the level of the module. However, this reduces the safety as no detection on the cell level is performed.

In patent document US20150340888A1, a battery system is disclosed for transmitting data via a power line between a master unit and a monitoring unit of a battery module or a battery cell by applying a load modulation technique wherein an impedance in a branch of the power line is varied by opening or closing a switch, resulting in a voltage variation at the terminals of the battery. One of the problems with this technique is that it is difficult to obtain a measurable voltage variation at the terminals, resulting in a low signal-to-noise ratio and poor transmission reliability, especially when the power line is noisy. Moreover, with this technique only data could be transmitted and no power can be transmitted.

Hence, there is room for improving the currently existing energy storage strings and the energy management devices.

SUMMARY OF THE INVENTION

It is an object of the present invention to provide an energy storage system that is robust, cost efficient and allows for a faster production process of the battery systems when compared to currently available battery systems. More specifically, it is an object of the present invention to strongly reduce or eliminate any wiring between the master control unit and local control units of a battery management system.

The present invention provides an energy storage system comprising an energy management device and an energy storage string formed by a plurality of rechargeable cells connected in series via electrical connectors, and wherein the energy storage string has a positive string terminal at a first end and a negative string terminal at a second end. The energy management device comprising a master control unit and at least a first local control unit associated to a first rechargeable cell of the plurality of rechargeable cells. The master control unit comprises a storage string connecting circuit electrically connecting the positive string terminal with the negative string terminal, a master AC signal generator and a master AC signal receiver. The first local control unit comprises a cell connecting circuit electrically connecting a positive and a negative cell terminal of the first rechargeable cell, a local AC signal generator and a local AC signal receiver.

The energy storage system according to the invention is characterized in that the storage string connecting circuit comprises a first capacitor device, and wherein the first capacitor device and the energy storage string are forming part of a first closed-loop LC-circuit, and the cell connecting circuit comprises a second capacitor device, and wherein the second capacitor device and the first rechargeable cell are forming part of a second closed-loop LC-circuit.

The energy storage system is further characterized in that the master AC signal generator is adapted for transmitting power to the local control unit by supplying a sequence of first AC pulses to the first closed-loop LC-circuit LC-1, and wherein the local AC signal receiver is configured for detecting the sequence of first AC pulses in the second closed-loop LC-circuit following propagation of the sequence of first AC pulses from the first to the second closed-loop LC-circuit, and rectifying the sequence of first AC pulses detected, thereby generating a first DC current for charging a first capacitor tank of the first local control unit.

Advantageously, by providing a closed-loop LC-circuit between the master control unit and the local control unit, an AC pulse can propagate via the electrical connectors that are interconnecting the rechargeable cells. Hence, no additional wiring needs to be provided between the master control unit and the local control units for transmission of signals.

Advantageously, in a closed-loop LC-circuit, a small input of current or voltage in the circuit on a specific frequency can lead to high amplitude outputs of current or voltage which can propagate through the circuit. Indeed, depending on the tuning of the operational frequency of the AC signal generator with respect to a natural resonant frequency of the LC-circuit, an amplification factor can be obtained.

As there is no need for auxiliary equipment such as opto-couplers used for example in prior art battery systems for isolating the CAN bus lines, a compact local control unit can be made, e.g. in the form of an IC, that can be mounted to the battery cells during the assembly process of the battery.

Advantageously, by transmitting AC signals as claimed, both AC power signals and AC data signals can be transmitted using the same transmission line.

It is to be noted that in embodiments according to the invention, for each of the rechargeable cells of the energy storage sting, a local control unit is provided.

In embodiments, the local AC signal generator is adapted for transmitting power to the master control unit or to a second local control unit associated to a second rechargeable cell by supplying a sequence of second AC pulses to the second closed-loop LC-circuit.

In embodiments, the master AC signal receiver is configured for detecting the sequence of second AC pulses in the first closed-loop LC-circuit following propagation of the sequence of second AC pulses from the first to the second closed-loop LC-circuit, and for rectifying the sequence of second AC pulses detected. In this way, a second DC current is generated and can be used for charging for example a capacitor tank or any other charge storage device of the master control unit.

In embodiments, each of the rechargeable cells is characterized by a frequency-dependent cell impedance $Z_C$, and wherein the cell impedance $Z_C$ is dominated by an inductance behaviour at a frequency above a characteristic frequency $f_L$, and wherein $f_{AC\text{-}1} \geq f_L$ and $f_{AC\text{-}2} \geq f_L$.

Indeed, the present invention is based on the insight of the inventors that rechargeable cells, such as battery cells or ultracapacitors, have such a characteristic frequency-dependent impedance profile, as revealed by e.g. frequency electrochemical impedance spectra, and that advantage can be taken of this characterization to use the rechargeable cells together with the busbars, i.e. the interconnecting electrical connectors of the cells, as a transfer channel for transmitting AC pulses between the master control unit and a local control unit and hence to allow for transmitting power and/or data. Indeed, the impedance spectra of for example battery cells show that at high frequencies, i.e. in the kHz range and higher, the impedance of a rechargeable battery cell increases and is predominantly determined by an inductance component. Hence by providing at least one capacitor device, the rechargeable cell or the string of rechargeable cells will together with the at least one capacitor device form an LC-circuit.

In embodiments, each of the rechargeable cells is characterized by a frequency-dependent cell impedance $Z_C$, and wherein the cell impedance $Z_C$ is dominated by an inductance behaviour at a frequency above a characteristic frequency $f_L$, and wherein the first capacitor device is defined such that $f_1 > f_L$ and the second capacitor device is defined such that $f_2 > f_L$, with $f_1$ and $f_2$ being a first and a second natural resonant frequency of respectively the first and the second closed-loop LC-circuit.

In embodiments according to the invention, the first local control unit comprises a microcontroller and an energy balancing circuit including a DC-DC voltage converter coupled between the capacitor tank of the local control unit and the positive and the negative cell terminals of the first rechargeable cell. In this way, by de-charging the capacitor tank, the first battery cell can be charged and inversely by charging the capacitor tank of the rechargeable cell, the rechargeable cell can be de-charged.

In embodiments, the master AC signal generator is operable at at least a first operational frequency $f_{AC-1}$ and the local AC signal generator is operable at at least a second operational frequency $f_{AC-2}$. In embodiments, the first and second operational frequency are equal while in other embodiments, the first and second operational frequency can be different.

Preferably, the first and second AC pulses further allow for transmission of data between the master and local control units. In embodiments, the master AC signal generator is adapted for transmitting first data to the first local control unit by defining a sequence of modulated first AC pulses and supplying this sequence of modulated AC pulses to the storage string connecting circuit and the local AC signal receiver is configured for receiving the first data by monitoring the sequence of modulated first pulses transmitted by the master AC signal generator and by demodulating modulated pulses received.

Similarly, for data transmission from a local control unit to the master control unit, the local AC signal generator is adapted for transmitting second data to the master control unit by defining a sequence of modulated second AC pulses and by supplying this sequence of modulated second AC pulses to the cell connecting circuit and the master AC signal receiver is configured for receiving the second data by monitoring the sequence of modulated second pulses transmitted by the local AC signal generator and by demodulating modulated pulses received.

In embodiments according to the present invention, the first capacitor device and/or the second capacitor device, the first operational frequency $f_{AC-1}$ and the second operational frequency $f_{AC-2}$ are adapted for optimizing a pulse transmission between the storage string connecting circuit and the cell connecting circuit.

In embodiments of energy storage systems according to the present invention, the first capacitor device of the storage string connecting circuit has a capacitance value C1 and the second capacitor device of the cell connecting circuit has a capacitance value C2, and wherein within a percentage deviation D a) the first operational frequency $f_{AC-1}$ being equal to $$\frac{\sqrt{\frac{1}{nL(C_1+C_2)}}}{2\pi},$$

with n being the number of rechargeable cells and L being the inductance of a rechargeable cell, and b) the second operational frequency $f_{AC-2}$ being equal to $$\frac{\sqrt{\frac{1}{mL(C_1+C_2)}}}{2\pi},$$

with $m = n-1$,
and wherein $D \leq 50\%$, preferably $D \leq 30\%$, more preferably $D \leq 20\%$.

In alternative embodiments of energy storage systems according to the present invention, the first capacitor device of the storage string connecting circuit has a capacitance value C1 and the second capacitor device of the cell connecting circuit has a capacitance value C2, and wherein a number n being the number of rechargeable cells is equal or larger than ten, preferably n is equal or larger than twenty, and wherein the capacitance values C1 and C2 are defined such that $$\frac{n \times C_1}{C_2} \geq 5,$$

preferably $$\frac{n \times C_1}{C_2} \geq 10,$$

more preferably $$\frac{n \times C_1}{C_2} \geq 20,$$

and wherein within a percentage deviation D:

$$f_{AC-1} = f_{AC-2} = \frac{\sqrt{\frac{1}{nL(C_1)}}}{2\pi},$$

with L being the inductance of a rechargeable cell, and wherein $D \leq 50\%$, preferably $D \leq 30\%$, more preferably $D \leq 20\%$.

In embodiments, generally the first operational frequency $f_{AC-1}$ and the second operational frequency $f_{AC-2}$ are comprised in a frequency range between 500 Hz and 100 MHz, preferably between 1 kHz and 500 kHz, more preferably between 1 kHz and 100 kHz.

In embodiments, the first operational frequency $f_{AC-1}$ of the master AC signal generator is selected to be within a first resonant region around a first natural resonant frequency $f_1$ of the first closed-loop LC-circuit LC-1 or, alternatively, selected to be within a second resonant region around a second natural resonant frequency $f_2$ of the second closed-loop LC-circuit. The first resonant region is hereby defined by a lower frequency $f_{LC-1-L}$ and an upper frequency $f_{LC-1-H}$ such that $Z_{LC-1}(f_{LC-1-L}) = Z_{LC-1}(f_{LC-1-H}) = X_{C1}(f_1)$ and the second resonant region is defined by a lower frequency $f_{LC-2-L}$ and an upper frequency $f_{LC-2-H}$ such that $Z_{LC-2}$ $(f_{LC-2-L}) = Z_{LC-2}(f_{LC-2-H}) = X_{C2}(f_2)$, with $f_1$ and $f_2$ being the first and second natural resonant frequency, $Z_{LC-1}$ and $Z_{LC-2}$ being a total impedance associated to respectively the first and the second closed-loop LC-circuit, and $X_{C1}$ and $X_{C2}$ being a capacitive reactance associated to respectively the first and the second capacitor device.

In embodiments, the second operational frequency $f_{AC-2}$ of the local AC signal generator is selected to be within the second resonant region around the second natural resonant frequency $f_2$ or, alternatively, selected to be within the first resonant region around the first natural resonant frequency $f_1$.

SHORT DESCRIPTION OF THE DRAWINGS

Figure 2A:
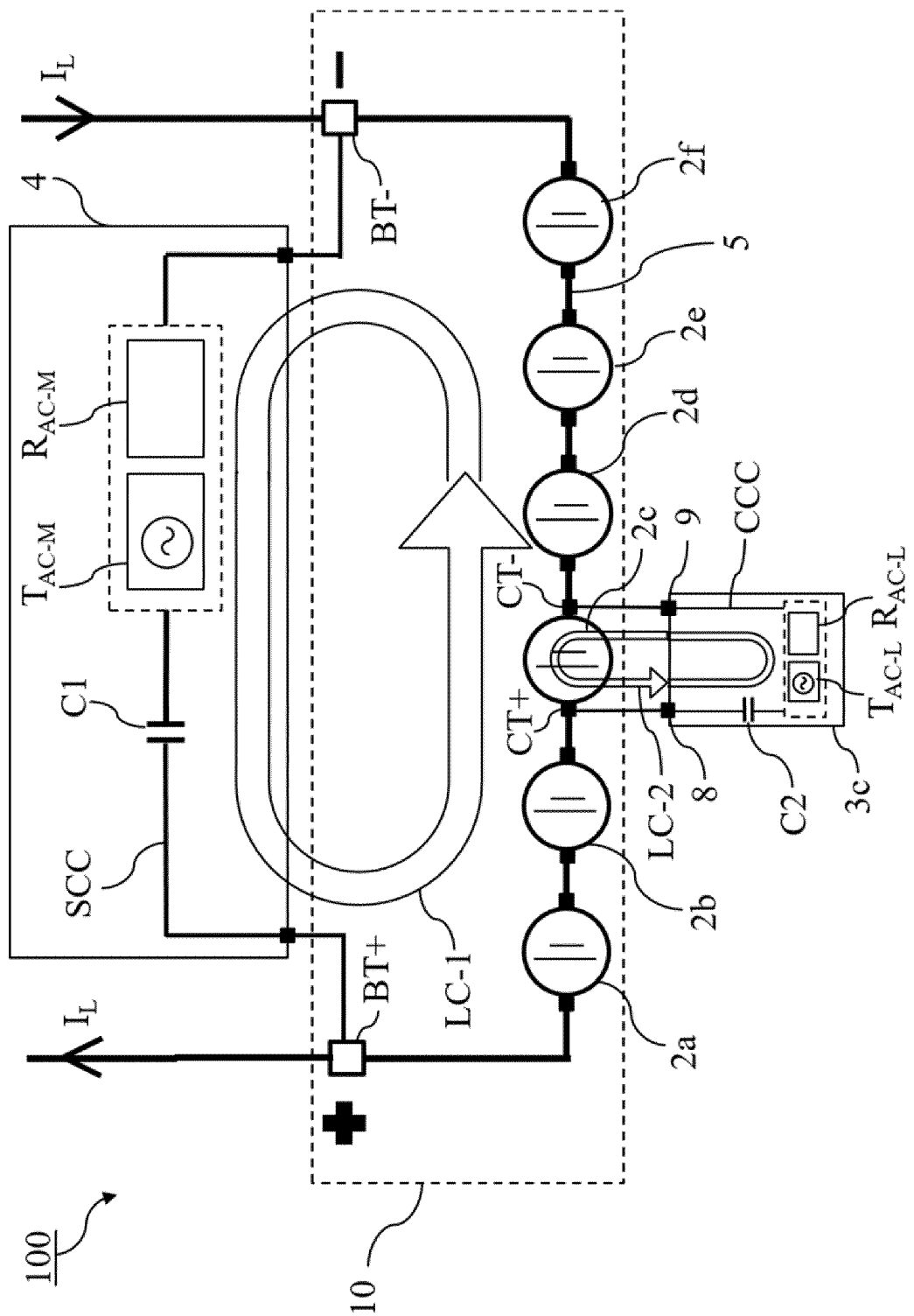
Figure 2B:
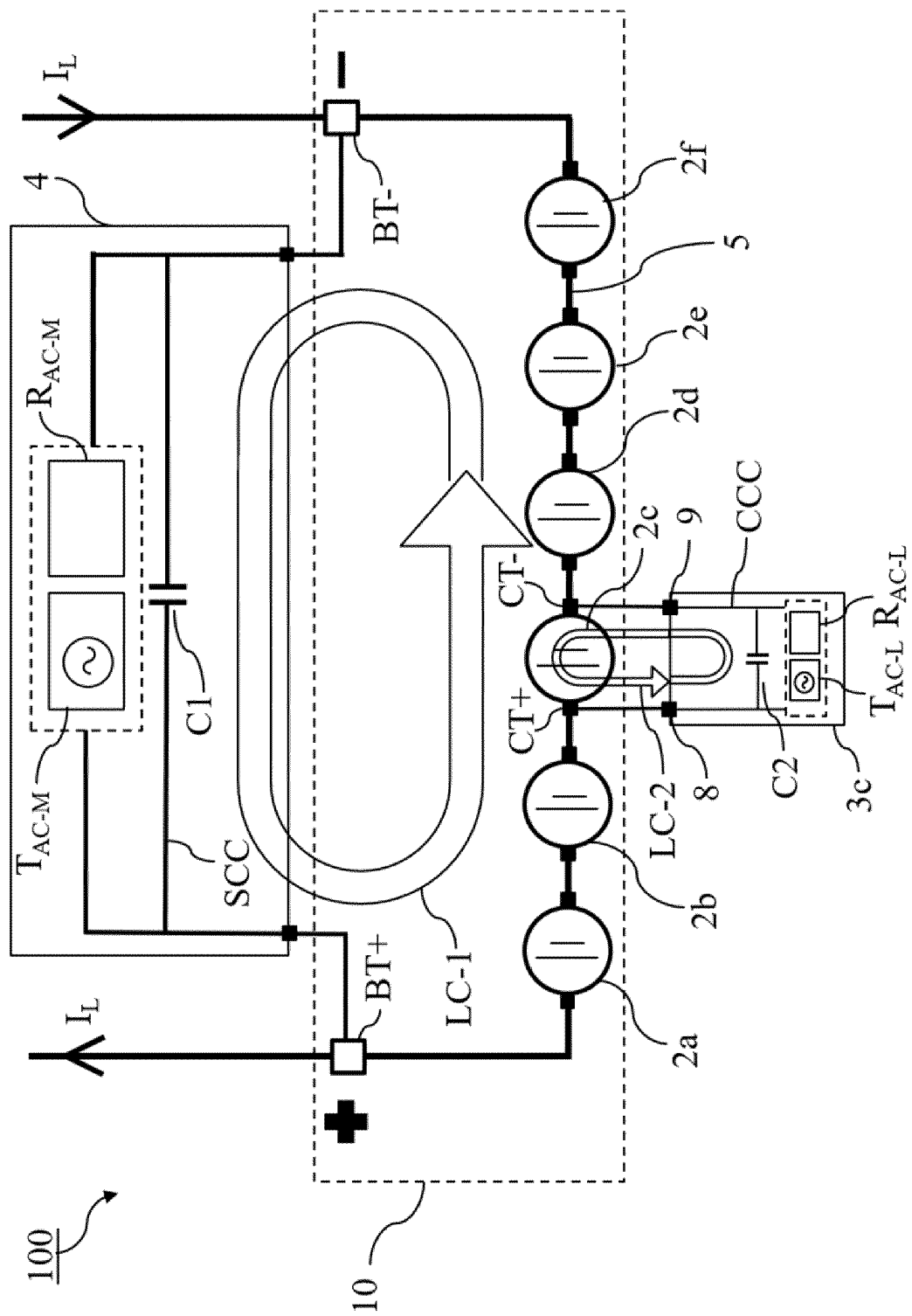
Figure 3:
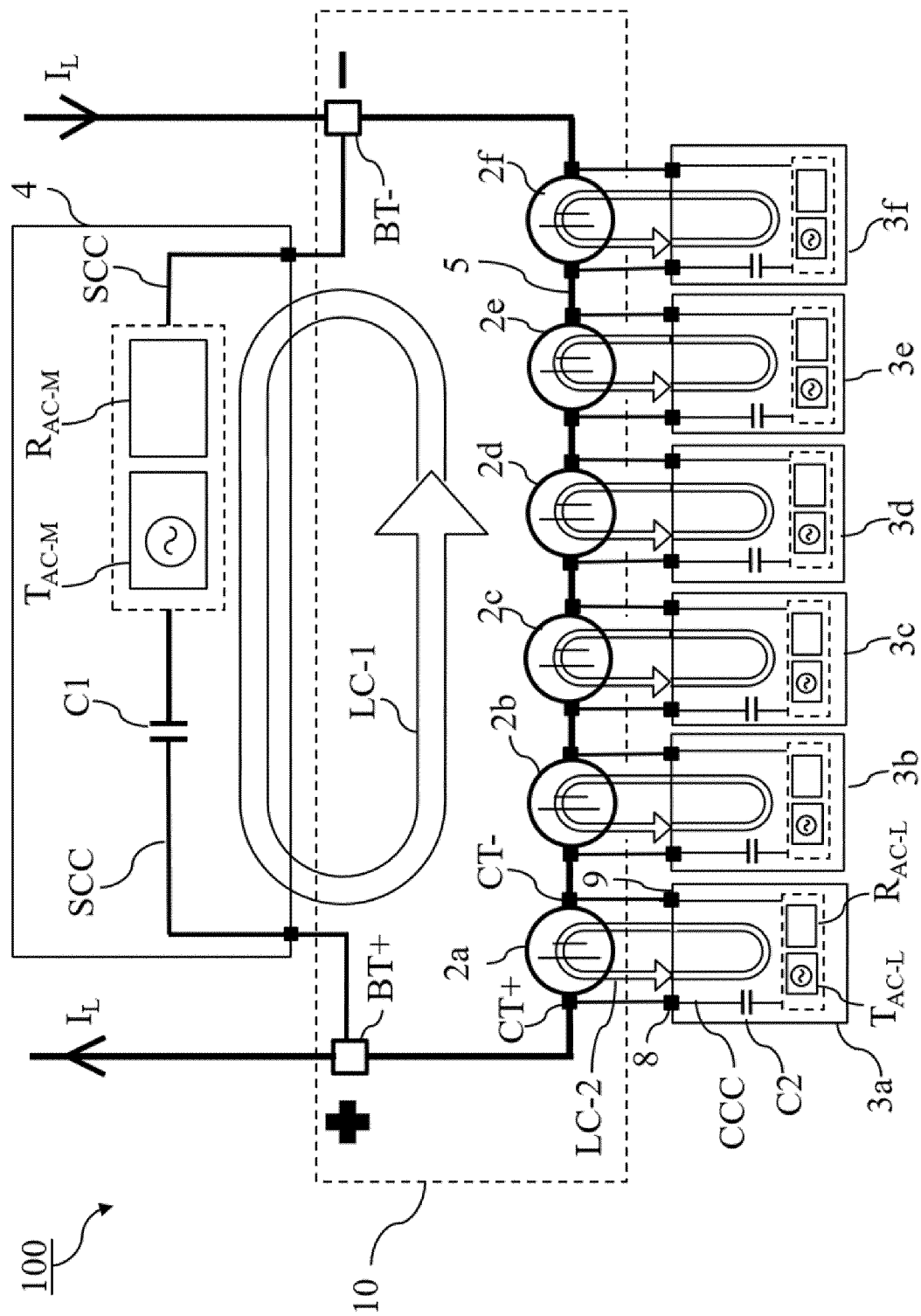
Figure 4A:
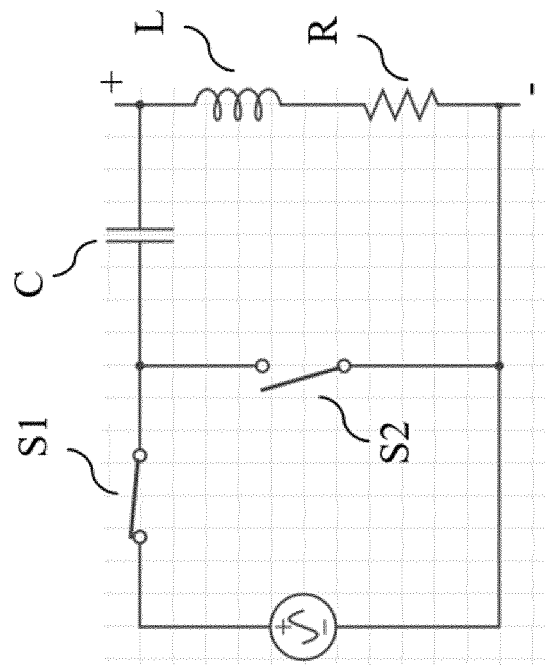
Figure 4B:
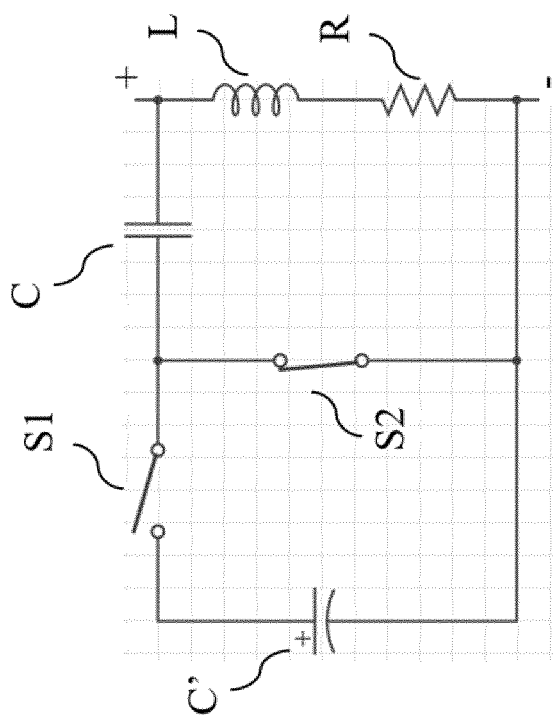
Figure 5B:
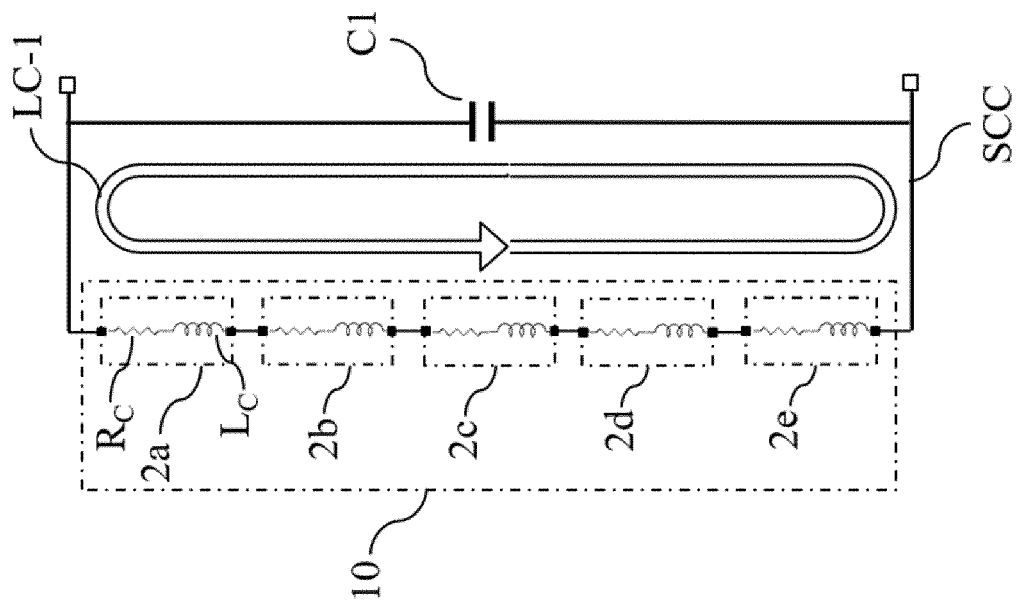
Figure 5A:
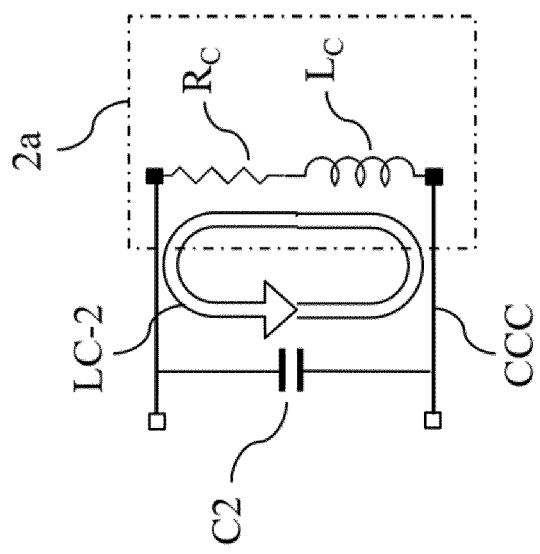
Figure 6B:
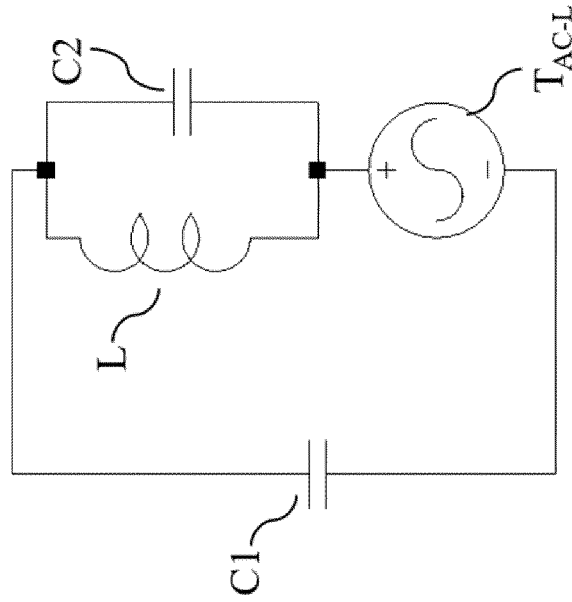
Figure 6A:
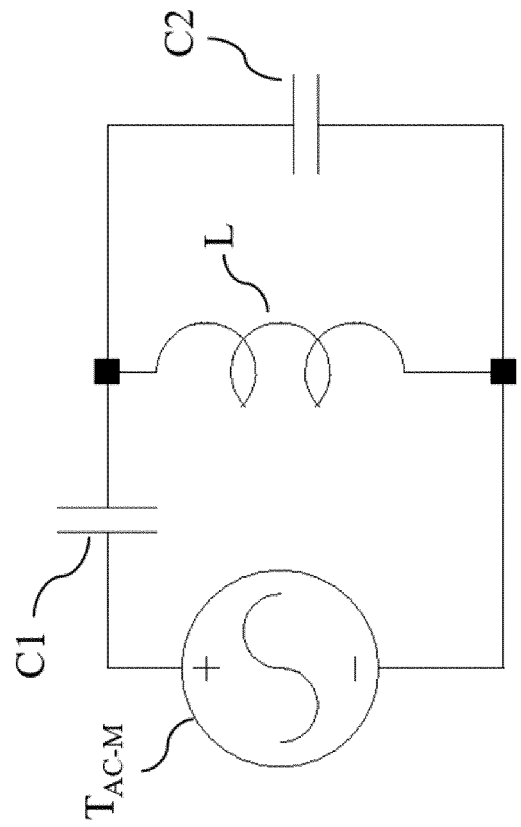
Figure 7:
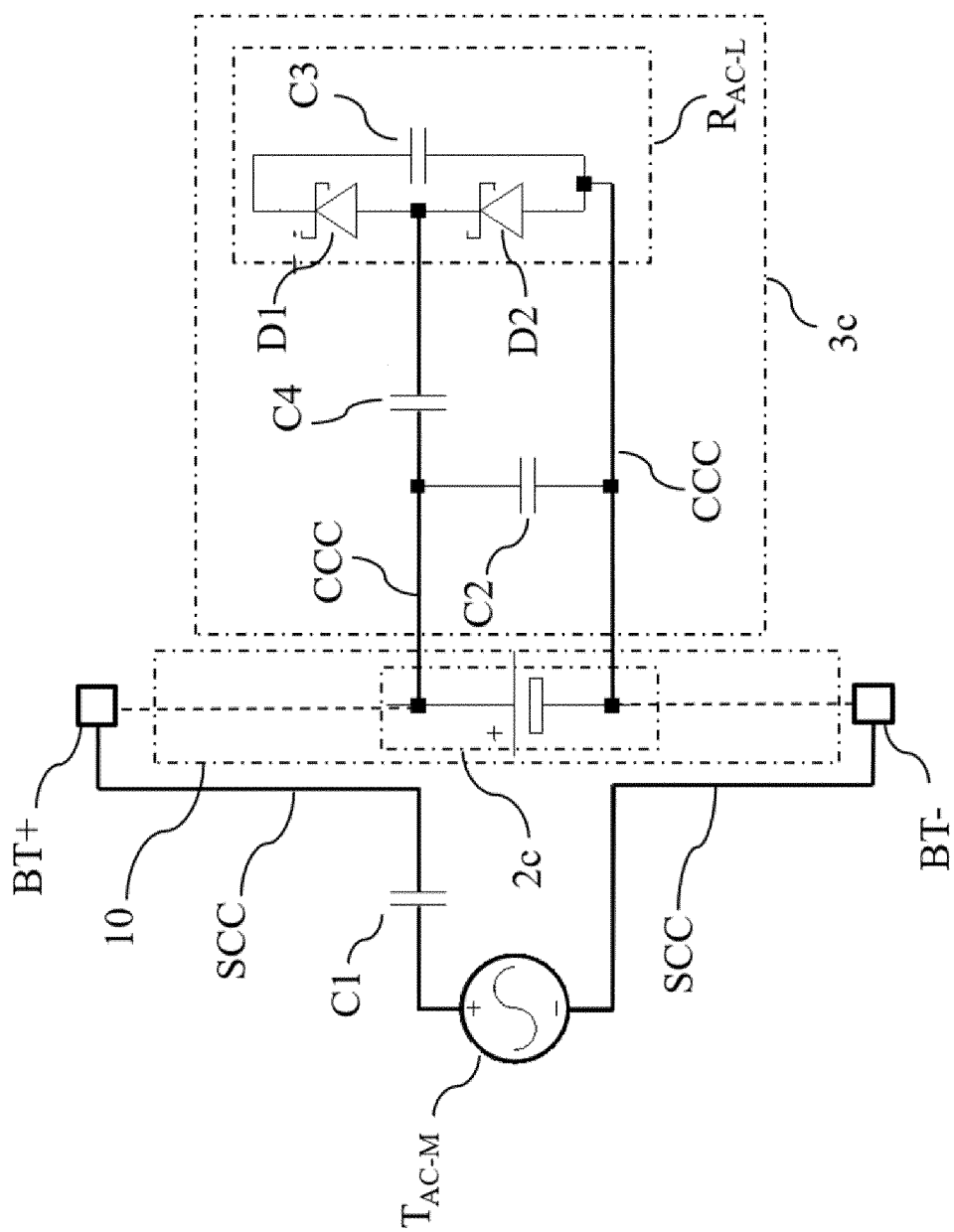
Figure 8:
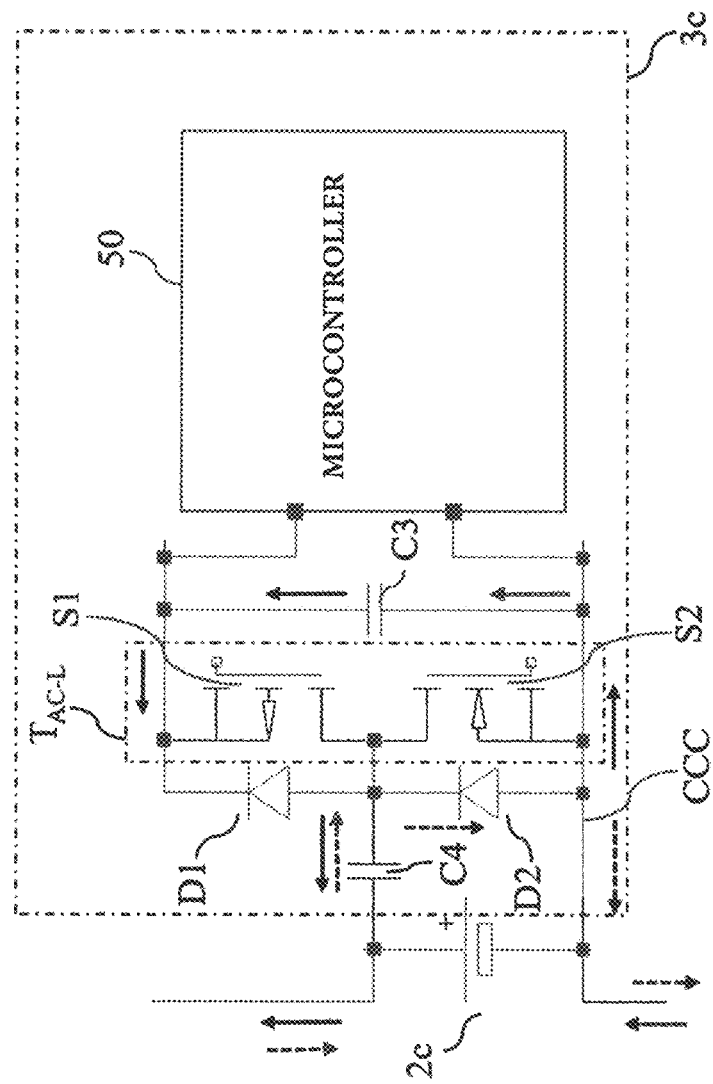
Figure 9:
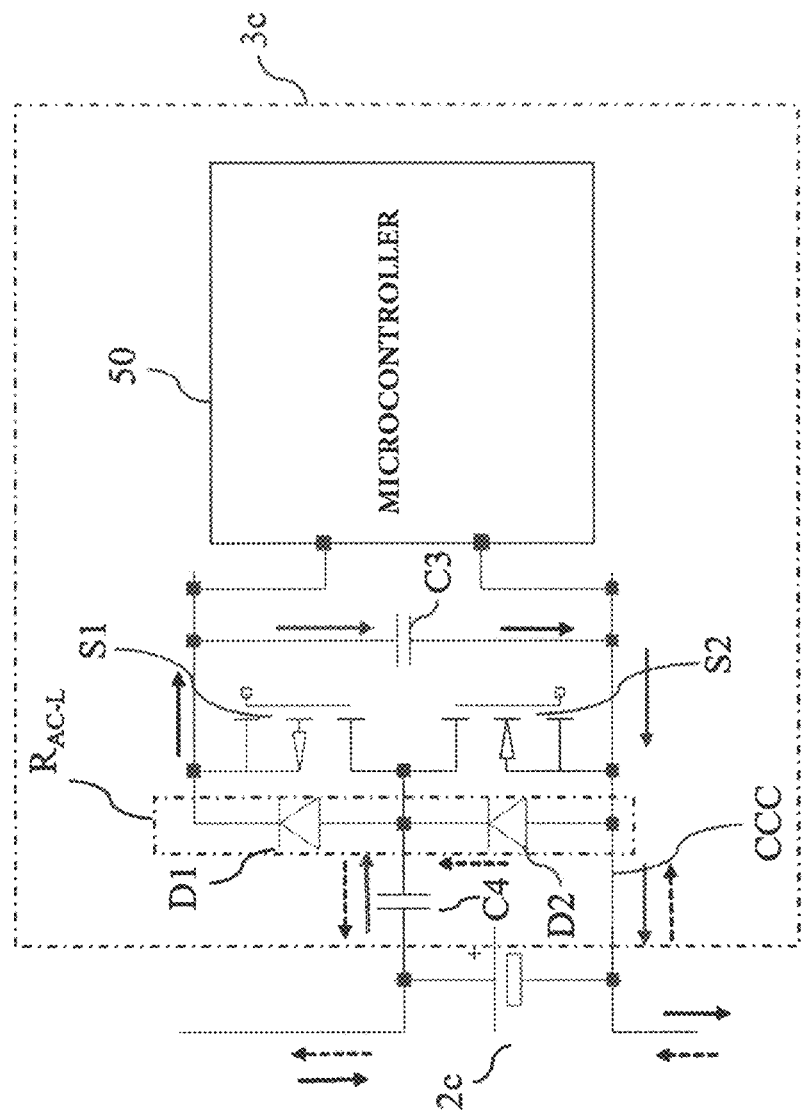
Figure 10:
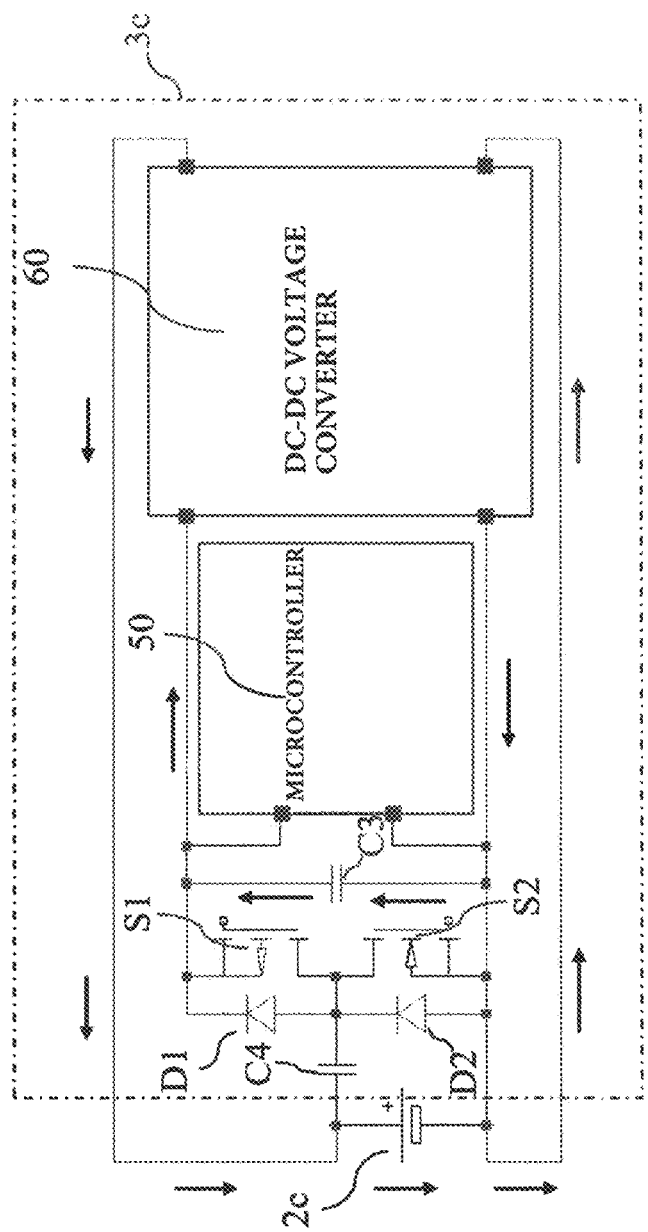
Figure 11:
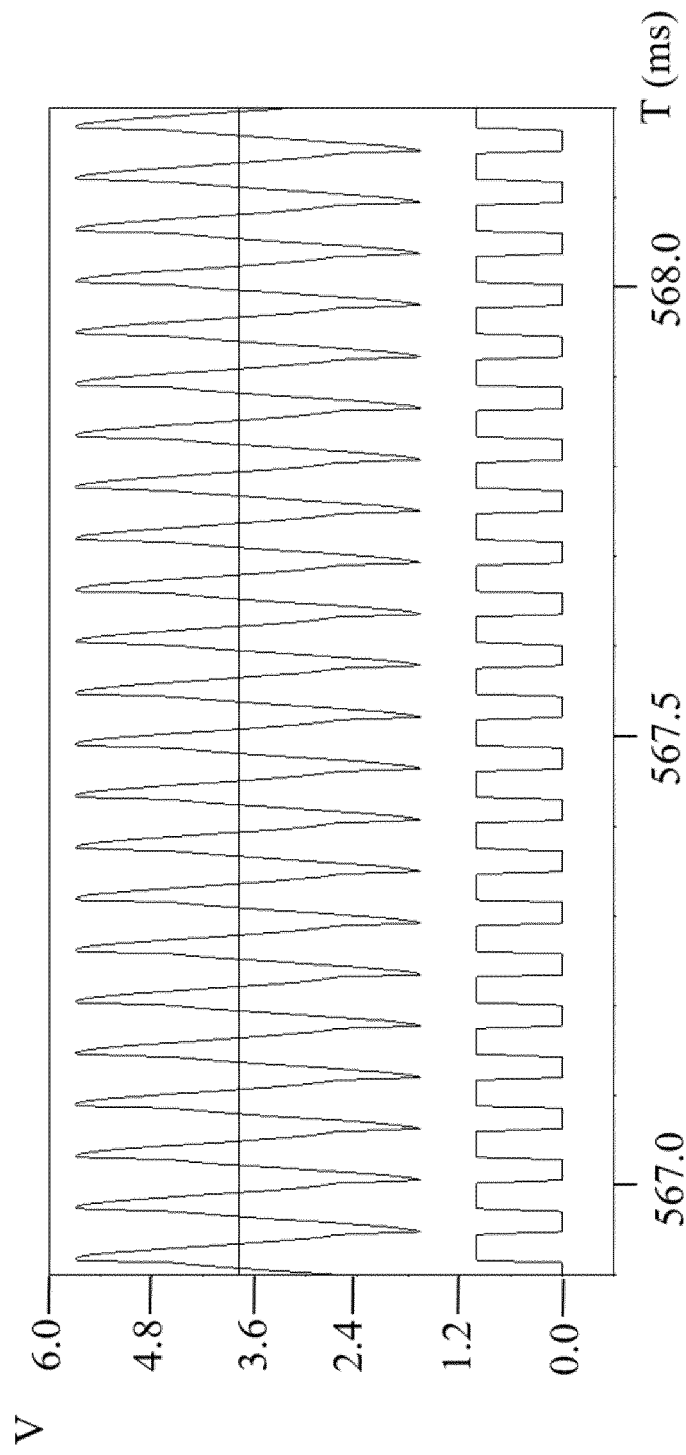
Figure 12:
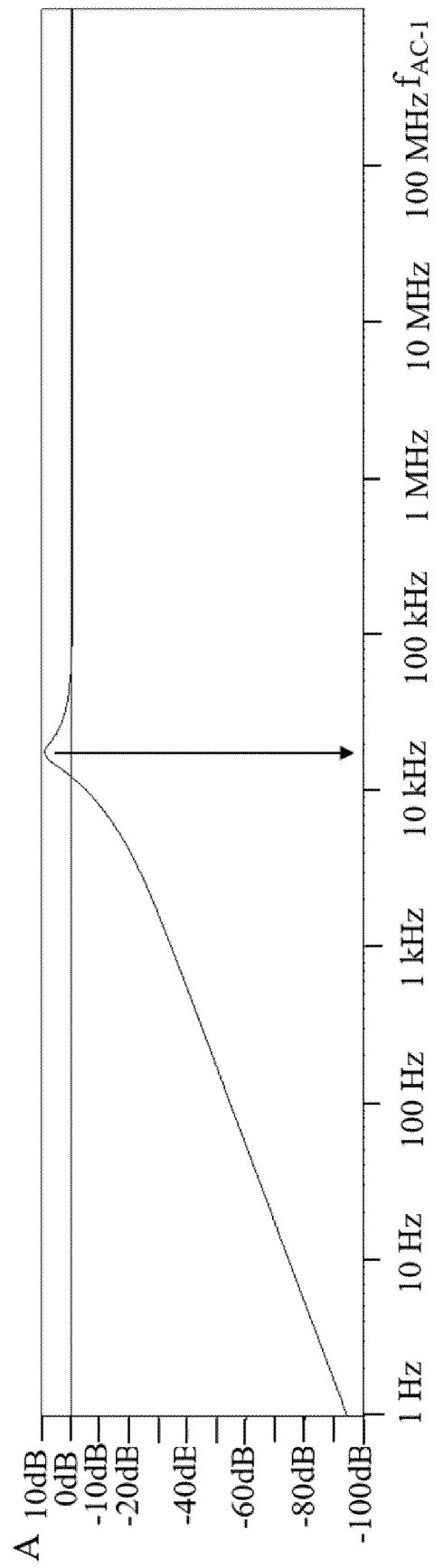
Figure 13:
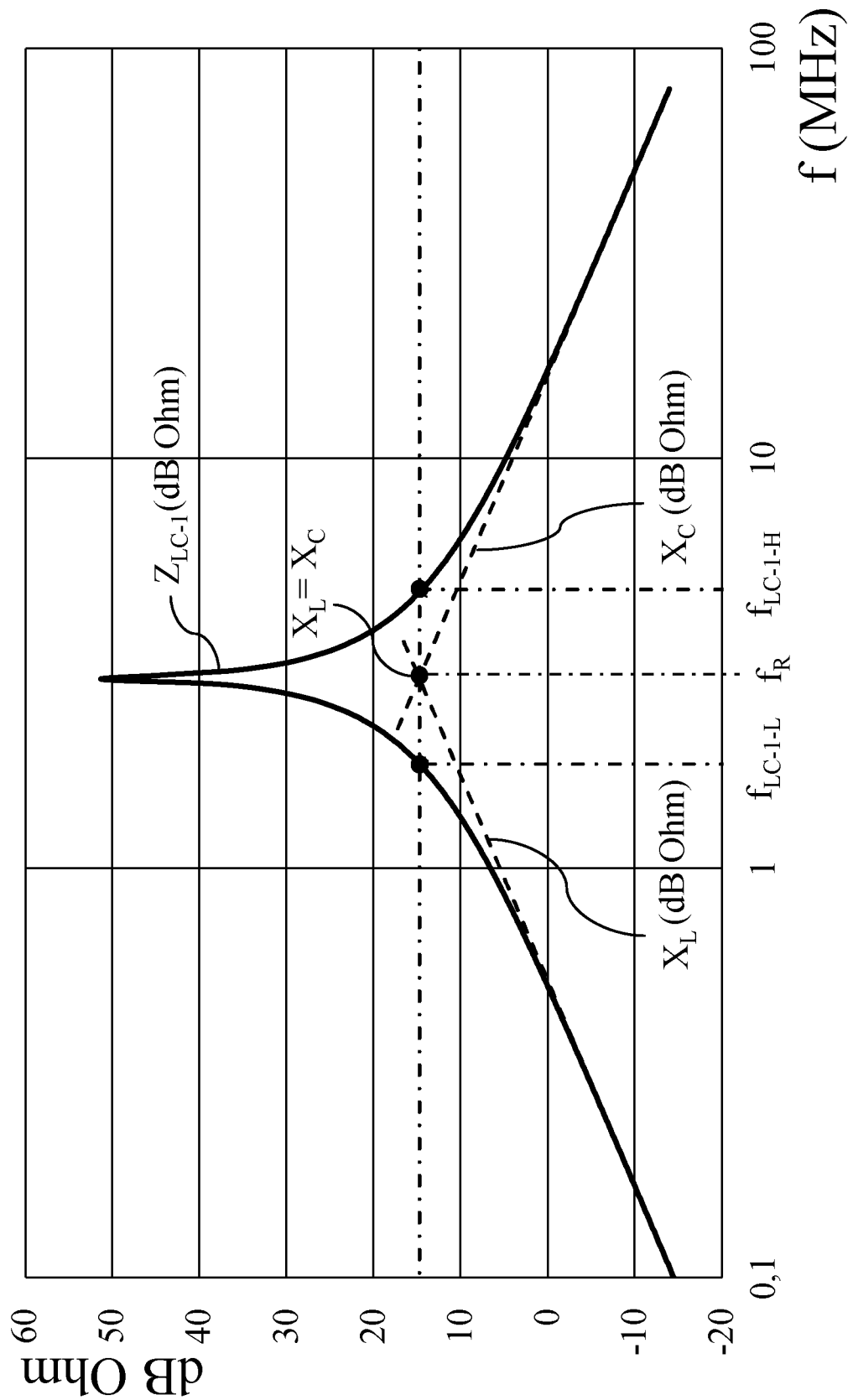

These and further aspects of the invention will be explained in greater detail by way of example and with reference to the accompanying drawings in which:

FIG. 1 shows a schematic representation of an example of battery system, as known in the art, FIG. 2a and FIG. 2b show schematic representations of energy storage systems according to embodiments of the invention for bi-directional AC pulse transmission between a master control unit and at least a first local control unit, FIG. 3 shows a schematic representation of an energy storage system according to the invention wherein a local control unit is associated to each of the rechargeable cells, FIG. 4a illustrates an example of a closed-loop LC circuit comprising switches, FIG. 4b illustrates a further example of a closed-loop LC circuit comprising switches, FIG. 5a shows a schematic representation of a second LC-circuit formed by a capacitor device and an inductor having an internal resistance, FIG. 5b shows a schematic representation of a first LC-circuit formed by a capacitor device and an energy storage string, FIG. 6a illustrates a model of a part of an energy storage system according to the invention comprising a master AC signal generator, FIG. 6b illustrates a model of a part of an energy storage system according to the invention comprising a local AC signal generator, FIG. 7 illustrates part of an energy storage system according to the invention comprising a rectifying circuit, FIG. 8 illustrates a generation of a sequence of AC pulses by a local signal generator, FIG. 9 illustrates a local control unit receiving a sequence of AC power pulses from a master control unit, FIG. 10 illustrates a charging process of a rechargeable cell by a local control unit, FIG. 11 illustrates an example of a sequence of AC block pulses generated by a AC signal generator and a sinusoidal signal detected by the AC signal receiver, FIG. 12 is an example of a frequency scan showing the presence of a resonance FIG. 13 illustrates a resonance of an RLC circuit and a definition of a lower and an upper frequency.

The figures are not drawn to scale. Generally, identical components are denoted by the same reference numerals in the figures.

DETAILED DESCRIPTION OF THE INVENTION

The present invention will be described in terms of specific embodiments, which are illustrative of the invention and not to be construed as limiting. It will be appreciated by persons skilled in the art that the present invention is not limited by what has been particularly shown and/or described above and that alternatives or modified embodiments could be developed in the light of the overall teaching of this disclosure. The drawings described are only schematic and are non-limiting.

Use of the verb "to comprise", as well as the respective conjugations, does not exclude the presence of elements other than those stated. Use of the article "a", "an" or "the" preceding an element does not exclude the presence of a plurality of such elements.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Reference throughout this specification to "one embodiment" or "an embodiment" means that a particular feature, structure or characteristic described in connection with the embodiments is included in one or more embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one ordinary skill in the art from this disclosure, in one or more embodiments.

When the wording "data" is used, it can refer to any form of control data, e.g. payload data, commands, operation parameters. The interpretation of data is a matter of the communication protocol used between the master control unit and the local control units.

When the wording "LC-circuit" is used throughout this specification it refers to a circuit comprising at least a capacitor and an inductor. This wording does not exclude that the LC-circuit also comprises a resistor or that the inductor can have a resistive component.

When the wording "bandwidth" of an LC-circuit is used, it refers to a frequency range between two frequency points, named half-power points, wherein the power in the LC-circuit is at half of the maximum value as obtained at the natural resonant frequency.

When the wording "capacitor device", "first capacitor device C1", "second capacitor device C2" or the like are used, it has to be construed as a device comprising at least one capacitor, i.e. the capacitor device is not necessarily a single capacitor but it can for example be a device composed of multiple capacitors placed in series or placed in parallel to provide for example a total capacitance value C1 or a total capacitance value C2.

When the wording "AC pulse sequence or sequence of AC pulses" is used, it has to be construed as a repetition of pulses of any type of periodic wave form. This can for example correspond to a sinus wave or it can correspond to a sequence of block pulses, triangular pulses or a sequence of pulses of any other shape. If the AC signal generator is producing for example a sinus wave, the operational frequency of the AC signal generator corresponds to the frequency of the sinus wave. On the other hand, if the AC signal generator is producing for example a block pulse, the operational frequency of the AC signal generator corresponds to the base frequency of the block pulses or the repetition frequency of the block pulses. An AC signal generator can also be named AC pulse generator. A data signal or a power signal can for example comprise a sequence of AC pulses.

In FIG. 2a, FIG. 2b and FIG. 3, energy storage systems 100 according to embodiments of the invention are schematically shown. A plurality of rechargeable cells, in this example six cells 2a to 2f, are electrically connected in series via electrical connectors 5 so as to form an energy storage string 10 having a first BT+ and a second BT− string terminal. The electrical connectors 5 are also known as busbars. Each rechargeable cell has a positive cell terminal CT+ and a negative cell terminal CT−, and when making a series connection the positive terminal of one cell is connected with the minus terminal of a neighbouring cell.

The rechargeable cell is for example a battery cell, such as a lithium ion battery, or a supercapacitor known in the art.

An energy management device is provided comprising a master control unit 4 and at least one local control unit 3c associated to one rechargeable cell 2c of the plurality of rechargeable cells, as illustrated on FIG. 2a FIG. 2b. The invention is however not limited to any number of rechargeable cells nor any number of local control units but there should be at least one local control unit associated to one rechargeable battery cell. The at least one local control unit 3c will be further named first local control unit and the first local control unit is associated to a first rechargeable cell 2c.

When comparing FIG. 2a or FIG. 3 with prior art energy storage systems as shown on FIG. 1, it becomes clear that with the current system there is no need for a data bus D-B, nor for a power bus P-B. Instead, the energy storage string 10 itself, formed by the cells and the electrical connectors, is used as a transmission line for transmitting AC pulses between the master control unit and at least one local control unit. The transmission of AC pulses through the energy storage string is made possible by creating at least one LC circuit as will be further outlined below in more detail.

As schematically illustrated on FIG. 2a, the master control unit 4 comprises a storage string connecting circuit SCC electrically connecting a first end and a second end of the storage string connecting circuit SCC with respectively the positive string terminal BT+ and the negative string terminal BT−. And, the first local control unit 3c associated to the first rechargeable cell 2c comprises a cell connecting circuit CCC electrically connecting a first end and a second end of the cell connecting circuit with respectively the first CT+ and the second CT− cell terminal of the first rechargeable cell 2a. The storage string connecting circuit and the cell connecting circuit have to be construed as connecting circuits and these connecting circuits can comprise one or more circuit branches.

In embodiments, the storage string connecting circuit SCC comprises a first capacitor device C1 configured such that the first capacitor device C1 and the energy storage string 10 are forming part of a first closed-loop LC-circuit LC-1. As mentioned above, the rechargeable cells have an inductive behaviour at high frequencies and hence the series of rechargeable cells are, together with the electrical connectors, providing for an inductance in the first closed loop LC circuit.

In other embodiments, the cell connecting circuit CCC comprises a second capacitor device C2 configured such that the second capacitor device C2 and the first rechargeable cell 2c are forming part of a second closed-loop LC-circuit LC-2.

In embodiments, as illustrated on FIG. 2a, both the storage string connecting circuit SCC and the cell connecting circuit CCC comprise respectively a first capacitor device C1 and a second capacitor device C2. In this way, both a first closed-loop LC-circuit LC-1 and a second closed-loop LC-circuit LC-2 are formed.

To transmit AC pulses from the master control unit 4 to the at least one local control unit 3c, the master control unit comprises a master AC signal generator $T_{AC-M}$ operable at a first operational frequency $f_{AC-1}$. Typically, the master AC signal generator $T_{AC-M}$ is connected with the storage string connecting circuit and adapted for supplying a sequence of first AC pulses to the first closed-loop LC-circuit LC-1.

As the storage string connecting circuit and the cell connecting circuit are electrically connected via the rechargeable cells that are interconnected by the electrical connectors 5, an AC pulse supplied in the storage string connecting circuit will propagate to the cell connecting circuit of a local control unit where it can be detected. Thereto, the at least one local control unit comprises a local AC signal receiver $R_{AC-1}$ coupled with the cell connecting circuit CCC for picking up AC pulses detected in the second closed-loop LC circuit and which correspond to the AC pulses sent by the master control unit after propagation through the LC circuits.

Similarly, AC pulses supplied to the second closed-loop LC circuit will propagate to the first closed-loop LC circuit where it can be detected. Hence, energy storage systems of the present invention are equipped for bi-directional AC pulse transmission. As schematically illustrated on FIG. 2a and FIG. 2b, the at least one local control unit 3c comprises a local AC signal generator $T_{AC-L}$ operable at a second operational frequency $f_{AC-2}$. This local AC signal generator is generally connected with the cell connecting circuit and adapted for generating a second AC pulse in the second closed-loop LC circuit. The master control unit 4 further comprises a master AC signal receiver $R_{AC-M}$ for receiving AC pulses from the local control unit. The master AC signal receiver $R_{AC-M}$ is connected with the storage string connecting circuit SCC and adapted for picking up the AC pulses sent by the local control unit.

In FIG. 3, an embodiment is shown where six local control units 3a to 3f are associated to six rechargeable cells 2a to 2f, and wherein each of the local control units comprise a cell connecting circuit CCC such that a second closed-loop LC-circuit LC-2 is formed for each of the local control units. Each of the local control units also comprises an AC signal receiver such that each of the local control units can receive AC pulses from the master control unit. Each local control unit also comprises a local AC signal generator such that each local control unit can send an AC pulse to the master control unit.

The energy storage system according to the invention can be used with or without a load connected to the first BT+ and the second BT− string terminal. If a load is connected a DC current $I_L$ can be provided from the energy storage string to the load. A shielding inductor, not shown on FIG. 2a and FIG. 3, can then be used in the connection line connecting the energy storage string and the load for blocking off AC currents flowing to the load.

In practice, the operational pulse frequency $f_{AC-1}$ and $f_{AC-2}$ are selected to fall within a frequency range wherein the cell impedance $Z_C$ is predominantly dominated by an inductance component. Indeed, as known in the art, rechargeable battery cells or ultracapacitors are characterized by a frequency-dependent cell impedance $Z_C$ wherein the impedance $Z_C$ is dominated by an inductance behaviour at a frequency above a characteristic frequency $f_L$. This characteristic value can depend on the type of rechargeable cells but the value is generally around 1 kHz. Preferably, the operational pulse frequencies are selected such that $f_{AC-1} \geq f_L$ and $f_{AC-2} \geq f_L$.

In embodiments, the first capacitor device is defined such that $f_1 > f_L$ and the second capacitor device is defined such that $f_2 > f_L$, with $f_1$ and $f_2$ corresponding to the natural resonance frequencies of respectively the first and second closed-loop LC circuit.

In embodiments, the capacitor device C1 and the storage string inductance are either placed in a series configuration, as shown in FIG. 2a or in a parallel configuration as shown in FIG. 2b. Similarly, the capacitor device C2 and the inductance of a cell are either placed in a series or in a parallel configuration. If a series or a parallel configuration is used depends on the specific embodiment and can also change depending on whether an AC signal is to be sent or whether an AC signal is to be received. Indeed, a series or parallel connections depends on from where the circuit is observed.

Further, by using switches, circuit configurations can be changed. This is illustrated in FIG. 4a and FIG. 4b. In FIG. 4a, a parallel, high impedance circuit is observed from right to left, i.e. from the perspective of the + and − shown on the FIG. 4a. If however the states of the switches S1 and S2 would be reversed, a circuit is observed where the two capacitors in the circuit are connected in series, hence acting as a resulting capacitor having a lower total value. The capacitor with the lowest value will dominate the resulting capacitance, but also will take the largest amount of voltage across it. In the example in FIG. 4b, the voltage source observes, from left to right, a series RLC circuit, i.e. a low impedance circuit is observed.

How the two operational frequencies for the AC signal generators are to be defined in relation to a circuit resonance is now further discussed.

Tuning of the First and/or Second LC Circuit:

It is expected that to be able to propagate AC pulses between the master control unit and the first local control unit while maintaining an acceptable pulse amplitude at the receiver, the operational frequencies of the AC signal generators need to match with a circuit resonance frequency.

However, the inventors have observed that for maintaining an acceptable pulse amplitude after propagation of an AC pulse through the first and/or second LC-circuits, the first operational frequency $f_{AC-1}$ does not necessary need to be exactly equal to the second operational frequency $f_{AC-2}$ and the first LC-1 and/or the second LC-2 closed-loop LC-circuits do not necessarily need to operate both at their natural resonant frequency, as long as one of the two LC-circuits operates at a natural resonant frequency within a given tolerance.

A number of approaches will be discussed to practically determine the operational frequencies for the AC signal generators in relation to circuit resonances.

Considering first embodiments according to the invention wherein either the master control unit 4 is configured for forming the first closed-loop LC-circuit LC-1 or either the at least one local control unit 3c is configured for forming the second closed-loop LC-circuit LC-2.

A rechargeable cell can be modelled as comprising a resistor $R_C$ and an inductor $L_C$ and the first and second closed-loop LC circuits can schematically be presented as shown on FIG. 5b and FIG. 5a, respectively.

If the first closed-loop LC-circuit LC-1 is provided as shown on FIG. 5b, then a first natural resonant frequency $f_1$ can be defined with the known equation for LC-resonant circuits:

$$f_1 = \frac{\sqrt{\frac{1}{L_{tot} \, C_1}}}{2\pi} \quad (1)$$

wherein $L_{tot}$ corresponds to the total inductance of the LC-1 circuit, which in a first approximation is the sum of the inductances of the individual rechargeable cells.

If the second closed-loop LC-circuit LC-2 is provided as shown in FIG. 5a, then a second natural resonant frequency $f_2$ can be defined with the following equation:

$$f_2 = \frac{\sqrt{\frac{1}{L_C \, C_2} - \left(\frac{R_C}{L_C}\right)^2}}{2\pi} \quad (2)$$

wherein $L_C$ and $R_C$ are respectively the inductance and resistance of the rechargeable cell. Equation (2) corresponds to the known resonant equation for a capacitor in parallel with an inductor having a series resistance, as shown on FIG. 5a.

The inductance of the rechargeable cell $L_C$ can be deduced from for example frequency electrochemical impedance spectra. The capacitance values for the first C1 and/or second C2 capacitor device, can then be determined such that the first $f_1$ and/or second $f_2$ natural resonant frequencies are at frequencies higher than the above mentioned characteristic frequency $f_L$.

For embodiments of the invention only having the first closed-loop LC-circuit LC-1, in a first approximation, the first $f_{AC-1}$ and second $f_{AC-2}$ operational frequency are then selected to be equal within a percentage deviation D, to the first natural resonant frequency $f_1$. Similarly, for embodiments having only the second closed-loop LC-circuit, the first $f_{AC-1}$ and second $f_{AC-2}$ operational frequency are selected to be equal within a percentage deviation D, to the second natural resonant frequency $f_2$.

The percentage deviation D is for example equal or smaller than 50%, preferably D is equal or smaller than 30% and more preferably D is equal or smaller than 20%. The exact value of D for maintaining an optimum pulse transmission, depends on the number of rechargeable cells and the associated circuit resistance.

In a further approach, besides determining the natural resonant frequencies, also the bandwidths of the LC-circuits can be determined. The bandwidth is defined, as mentioned above, on a power versus frequency plot as the distance between the two frequency values where the power in the circuit is at half of its maximum value. Based on the knowledge of the components and associated resistances in the first and/or second closed-loop LC-circuits, a first bandwidth $BW_1$ and/or a second bandwidth $BW_2$ can be determined for respectively the first and/or second closed-loop LC-circuit. The bandwidths can be determined by for example making a calculation of by performing a scan, i.e. vary the operational frequency while detecting a variation of the pulse amplitude in the AC signal receiver. This scan can be done either by simulation or by measurement.

For embodiments of energy storage systems according to the invention comprising only the first closed-loop LC-circuit or comprising only the second closed-loop LC-circuit, the first operational frequency $f_{AC-1}$ and the second operational frequency $f_{AC\text{-}2}$ are then selected to fall respectively within the first bandwidth $BW_1$ or within the second bandwidth $BW_2$.

Considering now embodiments according to the invention wherein both the master control unit 4 is configured for forming the first closed-loop LC-circuit LC-1 and the at least one local control unit 3c is configured for forming the second closed-loop LC-circuit LC-2.

In a first approximation, the two resonant frequencies as discussed above could be calculation with equations (1) and (2). As a starting point, the first operational frequency $f_{AC\text{-}1}$ can then be selected such that within the percentage deviation D, the first operational frequency $f_{AC\text{-}1}$ is equal to the first natural resonant frequency $f_1$ and/or equal to the second natural resonant frequency $f_2$. Similarly, the second operational frequency $f_{AC\text{-}2}$ can be selected such that within the percentage deviation D, the second operational frequency $f_{AC\text{-}2}$ is equal to the first natural resonant frequency $f_1$ and/or equal to the second natural resonant frequency $f_2$.

An alternative starting point is to also determine the bandwidths of the LC circuits and the first operational frequency $f_{AC\text{-}1}$ can then be selected to fall within the first bandwidth $BW_1$ and/or within the second bandwidth $BW_2$, and the second operational frequency $f_{AC\text{-}2}$ can be selected to fall within the first bandwidth $BW_1$ and/or within the second bandwidth $BW_2$.

By performing a scan, i.e. varying the operational frequencies and measuring an amplitude response in the AC signal receiver, the operational frequencies can further be fine-tuned. In this way, a more iterative approach can be followed for tuning the LC-circuits.

A more rigorous approach will now be discussed to determine the resonant frequencies by taking into account that the first and second LC-circuits are coupled and by determining and optimizing a transfer/gain function H between the transmitter and the receiver such that an optimum AC pulse transmission is obtained.

Assuming first an energy storage string with one rechargeable cell (n=1) with inductance L, a master AC signal generator $T_{AC\text{-}M}$ and a first C1 and a second C2 capacitance device as shown on FIG. 6a.

A transfer/gain function H can be defined as the ratio between the voltage $V_C$ detected on C2, i.e. the second capacitor device C2 in the cell connecting circuit of the local control unit, and the voltage input $V_{source}$, i.e. the voltage provided by the master AC signal generator $T_{AC\text{-}M}$.

First suppose that $\omega L \gg R_C$, with $R_C$ being the rechargeable cell resistance, and L being the inductance of one rechargeable cell ($=L_C$). This assumption is true if the frequency is high enough. The transfer/gain function H can then be written as:

$$H = \frac{V_C}{V_{source}} = \frac{\omega^2 C_1 L}{\omega^2 C_1 L + \omega^2 C_2 L - 1} \quad (3)$$

with $\omega$ being the angular frequency and C1 and C2 being the capacitance value of respectively the first and second capacitor device. Hence, a maximum gain is obtained if the denominator in equation (3) is zero, which is at a resonance frequency $f_r$ equal to:

$$f_r = \frac{\sqrt{\frac{1}{L(C_1 + C_2)}}}{2\pi} \quad (4)$$

When considering an energy storage string with n number of rechargeable cells, then the transfer/gain function H becomes:

$$H = \frac{\omega^2 C_1 L}{n\omega^2 C_1 L + \omega^2 C_2 L - 1} \quad (5)$$

and the resonant frequency becomes:

$$f_r = \frac{\sqrt{\frac{1}{nL(C_1 + C_2)}}}{2\pi} \quad (6)$$

When $nC_1 \gg C_2$ then the transfer/gain function H can be simplified to:

$$H = \frac{\omega^2 C_1 L}{n\omega^2 C_1 L - 1} \quad (7)$$

and then the resonance frequency is simplified to:

$$f_r = \frac{\sqrt{\frac{1}{nLC_1}}}{2\pi} \quad (8)$$

In other words, the resonance frequency is determined by the capacitance value C1 of the first capacitor device in the master control unit, the inductance L of a rechargeable cell and the number n of rechargeable cells in the energy storage string. Hence, when designing an energy storage string according to the invention, there is full control over the specification of the first capacitor device C1 of the mater control unit and hence the definition of the resonant frequency. In order equation (8) to be valid within an acceptable percentage deviation, the capacitance value for C1 and C2 can be selected such that $$\frac{n \times C_1}{C_2} \geq 5,$$

preferably $$\frac{n \times C_1}{C_2} \geq 10,$$

more preferably $$\frac{n \times C_1}{C_2} \geq 20.$$

To be complete, if also taking into account the resistive part of the rechargeable cell, then the transfer/gain function becomes:

$$H = \frac{C_1\left(nC_1 + C_2 - \frac{L}{\omega^2 L^2 + R^2}\right) + j\frac{R}{\omega^3 L^2 + \omega R^2}}{\left(nC_1 + C_2 - \frac{L}{\omega^2 L^2 + R^2}\right)^2 + \left(\frac{R}{\omega^3 L^2 + \omega R^2}\right)^2} \quad (9)$$

With j the imaginary number ($j^2$=−1). The resonance frequency can be found by finding the maximal value for |H| by varying ω.

A pulse transmission in the other direction, i.e. from the at least one local control unit to the master control unit is now discussed. A corresponding model is schematically illustrated on FIG. 6*b*. In a similar way as discussed above, the transfer/gain function H can be deduced and one obtains:

$$H = \frac{\omega^2 L C_2 - 1}{m\omega^2 L C_1 + \omega^2 L C_2 - 1} \quad (10)$$

With m=n−1 and the resonance frequency is:

$$f_r = \frac{\sqrt{\frac{1}{mL(C_1 + C_2)}}}{2\pi} \quad (11)$$

When n is large then, n≈n−1=m, and hence the resonance frequency for operating from slave to master is about equal for operating from master to slave.

By defining the resonant frequency with the approach discussed above, the operational frequencies for the master and the local AC signal generator can be selected to be equal to the obtained resonant frequencies within the percentage deviation D mentioned above. For n larger than 10, preferably larger than 20, i.e. n≈n−1=m, the operational frequencies can be set to be equal.

Additionally, a frequency scan by using simulation tool or by performing a measurement can be made to verify that an optimum tuning of the circuit is obtained. In FIG. 12, an example is shown of a frequency san where the operational frequency of the master AC generator is varied while detecting a voltage amplitude A at the second capacitor device in the local control unit. In this example, the resonance frequency is at 17 kHz and an amplification of the output signal with respect to the input signal of almost 10 dB is observed at resonance.

The transmission of AC pulses between the master control unit and one or more local control units through the resonant circuits can be used both for data transmission as for power transmission as will be discussed in more detail here below.

Power Transmission:

The transmission of power from the master control unit to a local control unit is first discussed.

In case the resonant transmission line according to the invention is used for power transmission, the master AC signal generator ($T_{AC-M}$) is adapted for transmitting power to a local control unit by supplying a sequence of first AC pulses to the storage string connecting circuit SCC. The sequence of first AC pulses is forming a first power signal.

FIG. 6 schematically shows an example of a master AC signal generator $T_{AC-M}$ coupled with the storage string connecting circuit SCC, and wherein the storage string connecting circuit comprises the first capacitor device C1. As discussed above, the capacitor device C1 and the energy string 10 are forming a first closed-loop LC-circuit. The AC signal generator $T_{AC-M}$ is powered from for example a 12 V DC power supply of the master control unit but the voltage can be any other voltage. In FIG. 11, an example is show, in the bottom part of the figure, of a sequence of block pulses generated at a voltage value of one Volt. The sequence of first AC pulses supplied are then propagating through the energy storage string 10. With this example it will be further explained how a local control unit 3*c* of one of the rechargeable cells 2*c* of the energy storage string 10 will receive the AC power pulses from the master control unit.

In the example shown on FIG. 7, the local AC signal receiver $R_{AC-L}$ coupled to the cell connecting circuit CCC of the first local control unit 3*c* is configured for detecting the sequence of first AC pulses generated by the master controller and for rectifying the sequence of first AC pulses detected. An example of AC pulses received is shown on the top part of FIG. 11 where sinusoidal pulses are detected by the AC signal receiver. Those sinusoidal AC pulses have an amplitude that is amplified when compared to the one Volt input AC pulse due to the resonant LC-circuit. By rectifying the first AC pulses received, a first DC current is generated which is used for charging a first capacitor tank C3 of the first local control unit. The capacitor tank C3 can be considered at a power source for the local control unit. As shown on FIG. 7, the rectifying circuit comprises two diodes D1 and D2 configured such that only when the pulse is at a high level it is transmitted to the capacitor tank C3 and when the pulse is at a low level, the path to the capacitor tank C3 is blocked. In this example, the cell connecting circuit comprises a fourth capacitor C4.

Similarly, power can also be transmitted from a local control unit to the master control unit. Therefore, the local AC signal generator $T_{AC-L}$ is adapted for supplying a sequence of second AC pulses in the cell connecting circuit. The sequence of second AC pulses are forming a second power signal.

The generated second AC pulses by the local control unit further propagate through the energy storage string 10 and the pulses are finally detected by the master control unit in the storage string connecting circuit. Thereto, the master AC signal receiver $R_{AC-M}$ is configured for detecting the sequence of second AC pulses and for rectifying the sequence of second AC pulses detected. By rectifying the AC pulses received, a second DC current is generated and can be used for charging a capacitor tank or any other charge storage device of the master control unit 4. Similar to the rectifying circuit in the local AC signal receiver shown on FIG. 7, the rectifying circuit of the master AC signal receiver comprises for example two diodes configured as discussed above. FIG. 8 illustrates a local AC signal receiver $R_{AC-L}$ of a local control unit receiving AC pulses from the master control unit and rectifying the AC pulses received. On FIG. 9, the black arrows illustrated the current flow when the AC pulse is high and the dotted arrow illustrates the current flow when the AC pulse is low. The net result is that the capacitor tank C3 is charged. The embodiment shown on FIG. 9 is an example where the capacitor C2 as shown on FIG. 7 is left out and only the capacitor C4 is used in the cell connecting circuit.

In embodiments, a first local control unit can also send power pulses to a second local control unit instead of sending the power to the master control unit. Thereto, the local AC signal receiver of the second local control unit is configured for detecting the sequence of second AC pulses transmitted by the local AC signal generator $T_{AC-L}$ of the first control unit. The detected pulses are then also rectified as discussed above and a further DC current is generated for charging a second capacitor tank of the second local control unit.

The AC signal generators can be implemented by using for example two mosfet transistor switches coupled to a voltage source. On FIG. 8, an example of a local AC signal generator $I_{AC-L}$ configured for generating power pulses is shown. The local AC signal generator uses a first S1 and a second S2 electronic switch which are coupled with the capacitor tank C3 as shown on FIG. 8. The capacitor tank C3 is charged for example at voltage value of for example 5 Volt. A microcontroller 50 of the local control unit is controlling the two switches S1, S2 and by alternating the opening and closing of the two switches S1 and S2 at the second operation frequency $f_{AC-2}$, AC block pulses, as shown on FIG. 11, are generated in the cell connecting circuit. The black arrows on FIG. 8, show the current flow when the first switch is open and the second switch is closed, while the dotted arrows show the current flow when the first switch is closed and the second switch is open, illustrating the generation of a sequence of second AC pulses in the cell connecting circuit which propagate further towards the storage string connecting circuit of the master control unit. In a similar way, the AC signal generator of the master control unit is implemented using two transistor switches and a voltage source of the master control unit.

Energy Balancing:

The local control unit also comprises an energy balancing circuit for maintaining the energy of the rechargeable cell in balance, i.e. de-charging or charging the rechargeable cell when upper and lower limits are reached. As illustrated on FIG. 10, the energy balancing circuit includes a DC-DC voltage converter 60 coupled between the capacitor tank C3 and the positive CT+ and the negative CT-cell terminals of the first rechargeable cell. The microcontroller 50 of the local control unit is configured for controlling a de-charging of the capacitor tank C3 while the rechargeable cell is charging. If the voltage of the rechargeable cell is lower than the voltage of the capacitor C3, then the DC-DC voltage converter can operate in a buck mode. For example if the capacitor tank is at 5V, the buck converter will convert the output voltage to the voltage needed for the rechargeable cell, for example 3.6 V in case the rechargeable cell is a lithium ion battery cell. The black arrows on FIG. 10 show the DC current flowing from the capacitor tank C3 to the rechargeable cell via the voltage converter.

Additionally, the microcontroller 50 is further configured for controlling a charging of the capacitor tank C3 and a de-charging of the first rechargeable cell 2c. If the voltage of the rechargeable cell is lower than the voltage of the capacitor C3, then the DC-DC voltage converter can operate in a boost mode. In case of a de-charging of the rechargeable cell, the DC current is flowing in the opposite direction compared to the direction shown on FIG. 10 by the black arrows.

Data Transmission:

In case the transmission line is used for data transmission, the master AC signal generator $T_{AC-M}$ is adapted for transmitting first data to the first local control unit by defining a sequence of modulated first AC pulses and supplying the sequence of modulated AC pulses to the storage string connecting circuit. The sequence of modulated first AC pulses are forming a first data signal. Similarly, the local AC signal generator $T_{AC-L}$ is adapted for transmitting second data to the master control unit 4 by defining a sequence of modulated second AC pulses and by supplying the sequence of modulated second AC pulses to the cell connecting circuit. The sequence of modulated second AC pulses are forming a second data signal.

Various known modulation techniques can be applied for modulating the AC pulses when data need to be transmitted between the master control unit and the local control units and vice-versa, e.g. pulse amplitude modulation, pulse count modulation, pulse width modulation (PWM) or pulse position modulation (PPM). Reference is hereby made to EP3061197B1 where these modulation techniques for modulating block pulses are discussed.

To generate modulated pulses, the master AC signal generator and the local AC signal generator comprises a modulation unit adapted for encoding data as a sequence of bits, e.g. "0", "1" and "no data-bit". Starting for example from initial block wave pulses generated by a block signal generator, the modulation unit can encode data using any modulation technique known in the art. The modulation can be introduced by changing for example the time distance between the rising (falling) edges of consecutive pulses, or by changing the time distance between a rising and falling edge of one pulse.

Any suitable higher level protocol can be used to define a data package composed of bits "0" and "1". For example, with a 16-bit data package, the first 10 bits can be used to define an address associated to the local control unit and the last six bits can be used for defining command signals. In this example, 1024 local control units can be addressed and 64 commands can be defined. The length of the data-packet may be adapted to the needs, i.e. the number of local control units and the number of various commands exchanged between the master control unit and the local control units.

For receiving the first data transmitted by the master control unit, the local AC signal receiver $R_{AC-L}$ is configured for receiving the first data by monitoring the sequence of modulated first pulses transmitted by the master AC signal generator and by demodulating modulated pulses detected.

Similarly, for receiving the second data transmitted by the local control unit, the master AC signal receiver $R_{AC-M}$ is configured for receiving the second data by monitoring the sequence of modulated second pulses transmitted by the local AC signal generator and by demodulating modulated pulses detected.

A resistor can for example be provided in the cell connecting circuit and/or in the storage string connecting circuit such that respectively the local AC signal receiver and/or master AC signal receiver can be configured for detecting the transmitted modulated AC pulses as a voltage signal measured over the resistor.

Depending on the modulation technique applied, the demodulation unit of the local and master AC signal receiver can decode the modulated pulses accordingly. For example by measuring the time period between the rising edge of two consecutive pulses, or the time period between a rising and falling edge of one pulse. A match is then found between the measured time period and predefined time periods and a corresponding bit value for example "0" or "1" or "no data-bit" can be assigned.

In embodiments according to the invention a specific modulation technique can be applied when the first operational frequency $f_{AC-1}$ and the second operational frequency $f_{AC-2}$ have a different value. In these embodiments, the master AC signal generator $T_{AC-M}$ and the local AC signal generator $T_{AC-L}$ are configured to be operable at both the first and second operational frequency.

First data can be transmitted from the master control unit to the first local control unit by defining a sequence of frequency modulated first AC pulses using a communication protocol that is based on the two signal frequencies $f_{AC-1}$ and $f_{AC-2}$. The sequence of frequency modulated first AC pulses defined are then supplied to the storage string connecting circuit.

Similarly, second data can be transmitted from the first control unit to the master control unit by using the same communication protocol based on the two signal frequencies $f_{AC-1}$ and $f_{AC-2}$. Hence, in these embodiments, the local AC signal generator $T_{AC-L}$ is configured for transmitting second data to the master control unit 4 by defining a sequence of frequency modulated second AC pulses using the communication protocol based on the two operational pulse frequencies $f_{AC-1}$ and $f_{AC-2}$ and by supplying the sequence of frequency modulated second AC pulses to the cell connecting circuit.

For receiving the first data, the local AC signal receiver $R_{AC-L}$ is configured for monitoring the sequence of frequency modulated pulses in the cell connecting circuit and for demodulating frequency modulated pulses detected. Similarly, for receiving the second data, the master AC signal receiver $R_{AC-M}$ is configured for monitoring the sequence of frequency modulated pulses in the storage string connecting circuit and for demodulating frequency modulated pulses detected.

Operational Frequencies, Ranges:

As discussed above and illustrated on FIG. 11, by making use of the resonant RLC circuits and by operating the operational frequency of the AC signal generators at the resonant frequency of the RLC circuit, a strong gain in amplitude is obtained. This occurs for example when the local AC receiver is detecting an AC signal generated by the master AC signal generator, and vice-versa when the master AC receiver is detecting an AC signal generated by the local AC signal generator.

In other words, a signal amplitude of the first AC signal when detected by the local AC signal receiver is larger than a signal amplitude of the first AC signal supplied by the master AC signal generator, and a signal amplitude of the second AC signal when detected by the master AC signal receiver is larger than a signal amplitude of the second AC signal supplied by the local AC signal generator. This amplification of the amplitude is possible by selecting the operational frequencies of the signal generators in relation to the natural resonant frequencies of the first and/or second closed-loop LC circuits.

However, the operational frequency of the master AC signal generator and/or the local AC signal generators do not need to be tuned exactly at the resonant frequency to obtain a sufficient gain to transfer power or data between the master and the local control units. Therefore, an operational frequency range between a lower frequency and an upper frequency around the resonant frequency can be defined and determined to operate the AC signal generators for the purpose of power and data transmission, as outlined here below.

The method to define the operational ranges for the AC signal generators is illustrated on FIG. 13. The first dotted line on FIG. 13 that is increasing with frequency corresponds to the inductive reactance $X_L = 2 \times \pi \times f \times L$, with f and L being respectively the frequency and the inductance. The second dotted line in FIG. 13 that is decreasing with frequency is the capacitive reactance $X_C = 1/[2 \times \pi \times f \times C]$. In this example, L corresponds to the inductance of the energy storage string formed by the plurality of cells and is in this example take to be equal to 300 nanohenry. The capacitance C corresponds to the first capacitor device C1 that together with the energy storage string is forming part of the first closed-loop LC-circuit LC-1. In this example C is taken to be equal to 10 nanofarad. The inductive reactance is crossing the capacitive reactance at the resonant frequency $f_R$ of the circuit, hence at the resonant frequency $X_L(f_R) = X_C(f_R)$.

In FIG. 13, $X_L$ and $X_C$ are plotted on a decibel Ohm (dB Ohm) scale, i.e. a logarithm of a ratio of $X_L$ and $X_C$ with respect to a reference value are taken. More specifically, $X_L$ (dB Ohm)$= 20 \times \log_{10}(X_L/Z_{ref})$ and $X_C$ (dB Ohm)$= 20 \times \log_{10}(X_C/Z_{ref})$, with $Z_{ref}$ being a reference impedance, in this example taken to be equal to 1 Ohm.

The full line in FIG. 13 corresponds to the total impedance of the RLC resonant circuit, in this example the LC-1 closed loop circuit. This total impedance of the resonant circuit is also expressed on the decibel Ohm scale, such that $Z_{LC-1}$ (dB Ohm)$= 20 \times \log_{10}(Z_{RLC}/Z_{ref})$, with $Z_{ref}$ being the one Ohm reference impedance. The total impedance $Z_{RLC}$ of the RLC circuit has contributions from $X_L$, $X_C$ and the resistance R of the circuit which is taken in this example to be equal to 5 milliohm. In practice, the total impedance of the RLC circuit can for example be measured with an impedance analyzer.

The lower and upper frequencies $f_{LC-1-L}$ and $f_{LC-1-H}$ indicated on FIG. 13 correspond to the positions where the total impedance has a dB value equal to the dB value where the inductive reactance and the capacitive reactance are equal. In this example, the resonance frequency is at 2.88 MHz, the lower frequency $f_{LC-1-L}$ at 1.78 MHz and the upper frequency $f_{LC-1-H}$ is at 4.68 MHz, and hence the operational range for the AC signal generator is to be selected between 1.78 MHz and 4.68 MHz.

The method to determine the lower and upper frequencies has been applied in the example shown on FIG. 13 for the first first closed-loop LC-circuit LC-1. The method can however be applied in the same way to determine an operational frequency when using the second closed-loop LC-circuit LC-2. For the LC-2 circuit, the inductive reactance that needs to be taken into account is the inductive reactance of a single cell and the capacitive reactance is the capacitive reactance of a the second capacitor device used for forming the second closed loop LC-circuit.

The example shown in FIG. 13 is applicable for an LC circuit wherein the capacitance is placed in parallel with the inductance and hence the total impedance of the LC circuit has a maximum at the resonance frequency. The method can however also been applied in a similar way as outlined above when the capacitance is placed in series with the inductance and wherein the total impedance of the LC circuit has a minimum at the resonance frequency. Also, for a series LC circuit, the lower and upper frequencies are determined as the frequencies where the impedance of the circuit is equal to the value corresponding to the value where the inductive reactance of the inductor of the circuit is equal to the capacitive reactance of the capacitor device of the circuit.

As discussed above, for maintaining an acceptable pulse amplitude after propagation of an AC pulse through the first and/or second LC-circuits, the first operational frequency $f_{AC-1}$ does not necessary need to be exactly equal to the second operational frequency $f_{AC-2}$ and the first LC-1 and/or the second LC-2 closed-loop LC-circuits do not necessarily need to operate both at their natural resonant frequency, as long as one of the two LC-circuits operates at a natural resonant frequency within the resonant region defined.

In summary, the first operational frequency $f_{AC-1}$ of the master AC signal generator $T_{AC-M}$ is selected to be within the first resonant region around the first natural resonant frequency $f_1$ or selected to be within the second resonant region around the second natural resonant frequency $f_2$ and/or the second operational frequency $f_{AC-2}$ of the local AC signal generator $T_{AC-L}$ is selected to be within the second resonant region around the second natural resonant frequency $f_2$ or selected to be within the first resonant region around the first natural resonant frequency $f_1$.

As discussed above, the first resonant region is defined by a lower frequency $f_{LC-1-L}$ and an upper frequency $f_{LC-1-H}$ such that $Z_{LC-1}(f_{LC-1-L})=Z_{LC-1}(f_{LC-1-H})=X_{C1}(f_1)$, and the second resonant region is defined by a lower frequency $f_{LC-2-L}$ and an upper frequency $f_{LC-2-H}$ such that $Z_{LC-2}(f_{LC-2-L})=Z_{LC-2}(f_{LC-2-H})=X_{C2}(f_2)$, with $Z_{LC-1}$ and $Z_{LC-2}$ being the total impedance associated to respectively the first LC-1 and the second LC-2 closed-loop LC-circuit, and $X_{C1}$ and $X_{C2}$ being the capacitive reactance associated to respectively the first C1 and the second C2 capacitor device.

In short, the energy storage system 100 according to the invention for transmitting AC signals in a resonant mode as discussed above, comprises an energy storage string 10 formed by a plurality of rechargeable cells 2a,2b,2c connected in series via electrical connectors 5, and wherein the energy storage string 10 has a positive string terminal BT+ at a first end and a negative string terminal BT− at a second end, an energy management device comprising a master control unit 4 and at least a first local control unit 3c associated to a first rechargeable cell 2c of the plurality of rechargeable cells, and wherein the master control unit comprises: i) a storage string connecting circuit SCC electrically connecting the positive string terminal BT+ with the negative string terminal BT−, ii) a master AC signal generator $T_{AC-M}$ operable at at least a first operational frequency $f_{AC-1}$ and iii) a master AC signal receiver $R_{AC-M}$, and wherein the first local control unit 3c comprises: i) a cell connecting circuit CCC electrically connecting a positive CT+ and a negative CT− cell terminal of the first rechargeable cell 2c, ii) a local AC signal generator $T_{AC-L}$ operable at at least a second operational frequency $f_{AC-2}$ and iii) a local AC signal receiver $R_{AC-L}$.

The energy storage system is further characterized in that the storage string connecting circuit SCC comprises a first capacitor device C1, and wherein the first capacitor device C1 and the energy storage string 10 are forming part of a first closed-loop LC-circuit LC-1, and the cell connecting circuit CCC comprises a second capacitor device C2, and wherein the second capacitor device C2 and the first rechargeable cell 2c are forming part of a second closed-loop LC-circuit LC-2. The master AC signal generator $T_{AC-M}$ is configured for supplying a first AC signal to the first closed-loop LC-circuit LC-1 and/or the local AC signal generator $I_{AC-L}$ is configured for supplying a second AC signal to the second closed-loop LC-circuit LC-2. Further, the master AC signal receiver $R_{AC-M}$ is configured for detecting the second AC signal in the first closed-loop LC-circuit LC-following propagation of the second AC signal from the second to the first closed-loop LC-circuit, and/or the local AC signal receiver $R_{AC-L}$ is configured for detecting the first AC signal in the second closed-loop LC-circuit LC-1 following propagation of the first AC signal from the first to the second closed-loop LC-circuit.

According to a further aspect of the invention as discussed above, a method is provided for resonant power and data transfer between a master control unit 4 of an energy storage string 10 formed by a plurality of rechargeable cells 2a,2b,2c connected in series via electrical connectors 5 and a local control unit 3c associated to a first rechargeable cell 2c of the plurality of rechargeable cells. The method according the present disclosure comprises electrically connecting a positive string terminal (BT+) at a first end and a negative string terminal (BT−) at a second end of the energy storage string with a storage string connecting circuit (SCC) comprising a first capacitor device (C1), such that the energy storage string (10) and the first capacitor device (C1) are forming part of a first closed-loop LC-circuit (LC-1), electrically connecting a positive (CT+) and a negative (CT−) cell terminal of the first rechargeable cell (2c) with a cell connecting circuit (CCC) comprising a second capacitor device (C1), such that the first rechargeable cell (2c) and the second capacitor device (C2) are forming part of a second closed-loop LC-circuit (LC-2), providing a master AC signal generator ($T_{AC-M}$) for supplying a first AC signal to the first closed-loop circuit, selecting a first operational frequency $f_{AC-1}$ for the master AC signal generator ($T_{AC-M}$) in relation to a first natural resonant frequency ($f_1$) of the first closed-loop LC-circuit (LC-1) and/or in relation to a second natural resonant frequency ($f_2$) of the second closed-loop LC-circuit (LC-2) such that a signal amplitude of the first AC signal when detected by the local AC signal receiver is larger than a signal amplitude of the first AC signal supplied by the master AC signal generator, providing a local AC signal generator ($T_{AC-M}$) for supplying a second AC signal to the second closed-loop circuit, selecting a second operational frequency $f_{AC-2}$ for the local AC signal generator ($T_{AC-L}$) in relation to the first natural resonant frequency ($f_1$) of the first closed-loop LC-circuit (LC-1) and/or in relation to the second natural resonant frequency ($f_2$) of the second closed-loop LC-circuit (LC-2) such that a signal amplitude of the second AC signal when detected by the master AC signal receiver is larger than a signal amplitude of the second AC signal supplied by the local AC signal generator, transmitting power or data from the master control unit to the local control unit by supplying AC signals to the first closed-loop LC circuit at the selected first operational frequency and detecting the AC signals supplied in the second closed-loop LC circuit, and/or transmitting power or data between from the local control unit to the master control unit by supplying AC signals to the second closed-loop LC circuit at the selected second operational frequency and detecting the AC signals supplied in the first closed-loop LC circuit.

The invention claimed is:

1. An energy storage system comprising
an energy storage string formed by a plurality of rechargeable cells connected in series via electrical connectors, and wherein said energy storage string has a positive string terminal at a first end and a negative string terminal at a second end, an energy management device comprising a master control unit and at least a first local control unit associated to a first rechargeable cell of said plurality of rechargeable cells, and wherein said master control unit comprises
a storage string connecting circuit electrically connecting said positive string terminal with said negative string terminal,
a master AC signal generator and
a master AC signal receiver, and wherein said first local control unit comprises
a cell connecting circuit electrically connecting a positive and a negative cell terminal of said first rechargeable cell,
a local AC signal generator and
a local AC signal receiver, and
wherein said storage string connecting circuit comprises a first capacitor device, and wherein said first capacitor device and said energy storage string are forming part of a first closed-loop LC-circuit, and
wherein said cell connecting circuit comprises a second capacitor device, and wherein said second capacitor device and said first rechargeable cell are forming part of a second closed-loop LC-circuit, and
wherein said master AC signal generator is adapted for transmitting power to said local control unit by supplying a sequence of first AC pulses to said first closed-loop LC-circuit, and wherein said local AC signal receiver is configured for detecting the sequence of first AC pulses in said second closed-loop LC-circuit following propagation of the sequence of first AC pulses from the first to the second closed-loop LC-circuit, and rectifying the sequence of first AC pulses detected, thereby generating a first DC current for charging a first capacitor tank of said first local control unit.

2. The energy storage system according to claim 1 wherein said local AC signal generator is adapted for transmitting power to said master control unit or to a second local control unit associated to a second rechargeable cell by supplying a sequence of second AC pulses to said second closed-loop LC-circuit.

3. The energy storage system according to claim 2 wherein said master AC signal receiver is configured for
detecting the sequence of second AC pulses in said first closed-loop LC-circuit following propagation of the sequence of second AC pulses from the first to the second closed-loop LC-circuit, and for
rectifying the sequence of second AC pulses detected, thereby generating a second DC current for charging a capacitor tank or any other charge storage device of said master control unit.

4. The energy storage system according to claim 2 comprising a second local control unit associated to a second rechargeable cell and wherein a local AC signal receiver of the second local control unit is configured for detecting said sequence of second AC pulses transmitted by the local AC signal generator of the first control unit and for rectifying the second AC pulses detected, thereby generating a further DC current for charging a capacitor tank of said second local control unit.

5. The energy storage system according to claim 1, wherein said first local control unit comprises a microcontroller and an energy balancing circuit, and wherein the energy balancing circuit includes a DC-DC voltage converter coupled between said first capacitor tank of said first local control unit and the positive and the negative cell terminals of the first rechargeable cell and wherein said microcontroller is configured for controlling
a charging of said first rechargeable cell by de-charging the first capacitor tank, and/or
a de-charging of said first rechargeable cell by charging the first capacitor tank.

6. The energy storage system according to claim 1, wherein said master AC signal generator is adapted for transmitting first data to said first local control unit by defining a sequence of modulated first AC pulses and supplying said sequence of modulated AC pulses to said first closed-loop LC-circuit and wherein said local AC signal receiver is configured for receiving said first data by monitoring the sequence of modulated first pulses transmitted by the master AC signal generator and by demodulating modulated pulses received.

7. The energy storage system according to claim 1, wherein said local AC signal generator is adapted for transmitting second data to said master control unit by defining a sequence of modulated second AC pulses and by supplying said sequence of modulated second AC pulses to said second closed-loop LC-circuit and wherein said master AC signal receiver is configured for receiving said second data by monitoring the sequence of modulated second pulses transmitted by the local AC signal generator and by demodulating modulated pulses received.

8. The energy storage system according to claim 1, wherein said master AC signal generator is operable at at least a first operational frequency and wherein said local AC signal generator is operable at at least a second operational frequency.

9. The energy storage system according to claim 8, wherein the first operational frequency is different from the second operational frequency and wherein said master AC signal generator is further operable at said second operational frequency and configured for transmitting first data to said first local control unit by defining a sequence of frequency modulated first AC pulses using a communication protocol based on said two signal frequencies and by supplying said sequence of frequency modulated first AC pulses to said first closed-loop LC-circuit, and wherein said local AC signal receiver is configured for receiving said first data by monitoring the sequence of frequency modulated first pulses transmitted by the master AC signal generator and by demodulating frequency modulated pulses received.

10. The energy storage system according to claim 9, wherein said local AC signal generator is further operable at said first operational frequency and configured for transmitting second data to said master control unit by defining a sequence of frequency modulated second AC pulses using a communication protocol based on the two operational pulse frequencies and by supplying said sequence of frequency modulated second AC pulses to said second closed-loop LC-circuit, and wherein said master AC signal receiver is configured for receiving said second data by monitoring the sequence of frequency modulated second AC pulses transmitted by the local AC signal generator and by demodulating frequency modulated pulses received.

11. The energy storage system according to claim 8, wherein each of said rechargeable cells comprises a frequency-dependent cell impedance, and wherein said cell impedance is dominated by an inductance behavior at a frequency above a characteristic frequency, and wherein the first operational frequency is greater than or equal to the characteristic frequency and the second operational frequency is greater than or equal to the characteristic frequency.

12. The energy storage system according to claim 8, wherein said first closed-loop LC-circuit has a first natural resonant frequency and a first bandwidth and wherein said first operational frequency and said second operational frequency fall within said first bandwidth.

13. The energy storage system according to claim 8, wherein said second closed-loop LC-circuit has a second natural resonant frequency and a second bandwidth and wherein said first operational frequency and said second operational frequency fall within said second bandwidth.

14. The energy storage system according to claim 8, wherein said first closed-loop LC-circuit has a first natural resonant frequency and a first bandwidth and said second closed-loop LC-circuit has a second natural resonant frequency and a second bandwidth, and wherein said first operational frequency falls within said first bandwidth and/or within said second bandwidth, and said second operational frequency falls within said first bandwidth and/or within said second bandwidth.

15. The energy storage system according to claim 8, wherein said first operational frequency of said master AC signal generator is selected to be within a first resonant region around a first natural resonant frequency (f1) of said first closed-loop LC-circuit or selected to be within a second resonant region around a second natural resonant frequency (f2) of said second closed-loop LC-circuit, and wherein said first resonant region is defined by a lower frequency fLC-1-L and an upper frequency fLC-1-H such that ZLC-1(fLC-1-L)=ZLC-1(fLC-1-H)=XC1(f1), and wherein said second resonant region is defined by a lower frequency fLC-2-L and an upper frequency fLC-2-H such that ZLC-2(fLC-2-L)=ZLC-2(fLC-2-H)=XC2(f2), ZLC-1 and ZLC-2 being a total impedance associated to respectively said first and said second closed-loop LC-circuit, and XC1 and XC2 being a capacitive reactance associated to respectively said first (C1) and said second (C2) capacitor device.

16. The energy storage system according to claim 15, wherein said second operational frequency of said local AC signal generator is selected to be within said second resonant region around said second natural resonant frequency or selected to be within said first resonant region around said first natural resonant frequency.

17. A method for transferring power between a master control unit of an energy storage string formed by a plurality of rechargeable cells connected in series via electrical connectors and a local control unit associated to a first rechargeable cell of said plurality of rechargeable cells, the method comprising electrically connecting a positive string terminal at a first end and a negative string terminal at a second end of the energy storage string with a storage string connecting circuit, and wherein the storage string connecting circuit comprises a first capacitor device, and wherein said first capacitor and said energy storage string are forming part of a first closed-loop LC-circuit, and electrically connecting a positive and a negative cell terminal of said first rechargeable cell with a cell connecting circuit, and wherein said connecting circuit comprises a second capacitor device, and wherein said second capacitor device and said first rechargeable cell are forming part of a second closed-loop LC-circuit, the method further comprising the steps of:

(a) transmitting power from said master control unit to said local control unit by: using a master AC signal generator of the master control unit for supplying a sequence of first AC pulses to said first closed-loop LC-circuit, using a local AC signal receiver of the local control unit for detecting the sequence of first AC pulses in said second closed-loop LC-circuit following propagation of the sequence of first AC pulses from the first to the second closed-loop LC-circuit, and rectifying the sequence of first AC pulses detected, or (b) transmitting power from said local control unit to said master control unit by: using a local AC signal generator of said local control unit for supplying a sequence of second AC pulses to said second closed-loop LC-circuit, using a master AC signal receiver of the master control unit for detecting the sequence of second AC pulses in said first closed-loop LC-circuit following propagation of the sequence of first AC pulses from the second to the first closed-loop LC-circuit, and rectifying the sequence of second AC pulses detected, or (c) transmitting power from said master control unit to said local control unit by: using a master AC signal generator of the master control unit for supplying a sequence of first AC pulses to said first closed-loop LC-circuit, using a local AC signal receiver of the local control unit for detecting the sequence of first AC pulses in said second closed-loop LC-circuit following propagation of the sequence of first AC pulses from the first to the second closed-loop LC-circuit, and rectifying the sequence of first AC pulses detected, and transmitting power from said local control unit to said master control unit by: using a local AC signal generator of said local control unit for supplying a sequence of second AC pulses to said second closed-loop LC-circuit, using a master AC signal receiver of the master control unit for detecting the sequence of second AC pulses in said first closed-loop LC-circuit following propagation of the sequence of first AC pulses from the second to the first closed-loop LC-circuit, and rectifying the sequence of second AC pulses detected.

* * * * *